US008776913B2

(12) United States Patent
Prajapati et al.

(10) Patent No.: US 8,776,913 B2
(45) Date of Patent: Jul. 15, 2014

(54) SPECIAL CURVE BRAZE SHEET FOR TOP LOADING CUTTER TO GET BETTER BRAZE STRENGTH

(75) Inventors: Jimykumar Prajapati, Spring, TX (US); Gregory T. Lockwood, Pearland, TX (US)

(73) Assignee: Smith International, Inc., Houston, TX (US)

( * ) Notice: Subject to any disclaimer, the term of this patent is extended or adjusted under 35 U.S.C. 154(b) by 226 days.

(21) Appl. No.: 13/272,642

(22) Filed: Oct. 13, 2011

(65) Prior Publication Data

US 2012/0090900 A1     Apr. 19, 2012

Related U.S. Application Data

(60) Provisional application No. 61/393,515, filed on Oct. 15, 2010.

(51) Int. Cl.
*E21B 10/36* (2006.01)
(52) U.S. Cl.
USPC ............................................ 175/57; 175/435

(58) Field of Classification Search
USPC ............................................ 175/57, 374, 435
See application file for complete search history.

(56) References Cited

U.S. PATENT DOCUMENTS

| | | |
|---|---|---|
| 4,453,605 A | 6/1984 | Short, Jr. |
| 4,605,157 A | 8/1986 | Barr et al. |
| 4,711,144 A | 12/1987 | Barr et al. |
| 2008/0257939 A1* | 10/2008 | Emaci et al. ................. 228/177 |
| 2009/0055135 A1 | 2/2009 | Tang et al. |
| 2010/0187020 A1* | 7/2010 | Zhang et al. ................. 175/428 |
| 2010/0276201 A1 | 11/2010 | Makkar et al. |
| 2010/0314176 A1* | 12/2010 | Zhang et al. ................. 175/383 |

OTHER PUBLICATIONS

International Search Report and Written Opinion for PCT Application PCT/US2011/056318 mailed May 30, 2012 (9 Pages).

* cited by examiner

*Primary Examiner* — William P Neuder
(74) *Attorney, Agent, or Firm* — Osha Liang LLP

(57) ABSTRACT

A method of brazing a top loading cutter into a cutter pocket is disclosed, wherein the method includes placing at least one braze disc between an inner wall of the cutter pocket and a portion of the top loading cutter and heating the at least one braze disc to a temperature above the melting temperature of the braze disc.

17 Claims, 19 Drawing Sheets

396001

SPECIAL CURVE BRAZE SHEET FOR TOP LOADING CUTTER TO GET BETTER BRAZE STRENGTH

CROSS-REFERENCE TO RELATED APPLICATIONS

Pursuant to 35 U.S.C. §119(e), this application claims priority to U.S. Provisional Application No. 61/393,515, filed Oct. 15, 2010, which is herein incorporated by reference in its entirety.

BACKGROUND OF INVENTION

1. Technical Field

Embodiments disclosed herein generally relate to braze discs. More specifically, embodiments disclosed herein relate to brazing top loading cutters using braze discs.

2. Background Art

FIG. 1 shows one example of a conventional drilling system for drilling an earth formation. The drilling system includes a drilling rig 10 used to turn a drilling tool assembly 12 that extends downward into a well bore. The drilling tool assembly 12 includes a drilling string 16, and a bottomhole assembly (BHA) 18, which is attached to the distal end of the drill string 16. The "distal end" of the drill string is the end furthest from the drilling rig.

The drill string 16 includes several joints of drill pipe 16a connected end to end through tool joints 16b. The drill string 16 is used to transmit drilling fluid (through its hollow core) and to transmit rotational power from the drill rig 10 to the BHA 18. In some cases the drill string 16 further includes additional components such as subs, pup joints, etc.

The BHA 18 includes at least a drill bit 20, also known as a primary cutting structure. Typical BHA's may also include additional components attached between the drill string 16 and the drill bit 20. Examples of additional BHA components include drill collars, stabilizers, measurement-while-drilling (MWD) tools, logging-while-drilling (LWD) tools, subs, hole enlargement devices also known as secondary cutting structures (e.g., hole openers and reamers), jars, accelerators, thrusters, downhole motors, and rotary steerable systems.

In the field of downhole drilling, cutting elements commonly referred to as "cutters" are used to cut or shear the working surface of a well. Cutters are typically loaded into a cutter pocket formed in the cutting surface of a downhole tool and brazed within the cutter pocket.

Methods used to create cutter pockets and to affix cutting elements therein include numerous steps. For example, a cutter pocket may be machined into a cutting tool body using electric discharge machining (EDM) or laser machining. However, the machining process may scoop out a cutter pocket larger than needed. Thus, a welding process may be performed to create at least one shoulder in the scooped out cutter pocket on which a cutting element abuts. After the welding is complete and the cutting tool body and the welded shoulders are allowed to cool, the weld metal is cleaned of welding residue using a grinding process performed manually. This process may also be used to shape the weld shoulder and to remove any irregular surfaces. The imprecise nature of the manual shaping process may prevent manufacturers from achieving the tolerances indicated in the original cutter pocket design.

Alternatively, cutter pockets may be formed in a mold. For example, in forming cutter pockets in a matrix drill bit, cutting element place holders may be positioned into a mold of a drill bit. Matrix material may then be placed into the mold around the cutting element place holders. Once the bit is formed, the place holders are removed to reveal cutter pockets.

Next, cutting elements may be inserted into the cutter pockets so as to abut the weld shoulders or inner side walls of the cutter pocket. Cutters may be disposed on drilling tools according to several processes. Specifically, cutters may be disposed as either top loading cutters (meaning the cutting elements are disposed in cutter pockets from the top of a tool) or front loading cutters (meaning the cutting elements are disposed in cutter pockets from the front of a tool). Top loading cutters may be used in various downhole tools. Examples of such tools may include fixed cutter drill bits, also known in the art as drag bits or PDC bits, hybrid drill bits, milling devices, and mill-head thereof, hole opening devices, such as reamers, and other various tools knows to those of ordinary skill in the art. Similarly, front loading cutting elements may also be used in various downhole tools, such as drill bits, milling devices, and hole opening devices.

The cutting elements are typically fixed to the cutter pockets using a brazing process. In the brazing process, a braze material (sometimes referred to as filler material) is positioned between the cutting element and the cutter pocket. The braze material is melted and, upon subsequent solidification, bonds the cutting element in the cutter pocket. Brazing is a metal joining process that typically occurs at temperatures between about 1100° F. and 1800° F. In particular, brazing occurs at temperatures above the melting point of the braze material and below the melting point of the base materials being joined (e.g., the cutter pocket and the cutting element). Thus, selection of braze materials depends on their respective melting temperatures and on the materials being joined. Braze materials are generally defined as alloys having a melting temperature above 840 F, but less than the components to be joined. Braze materials may include aluminum, copper, nickel, silver, or gold based alloys, for example.

It is also common to conduct brazing processes at temperatures low enough to avoid damage to the material being joined. For example, when brazing cutting elements and/or cutter pockets having ultrahard material such as diamond, the brazing temperature is generally below 1400° F. and preferably below 1300° F. to avoid damage to the diamond material. This temperature restriction greatly limits the number of alloys that can be used as braze alloy for cutting elements with diamond layers thereon because most brazing alloys that provide sufficient shear strength for bonding cutting elements to a cutting tool also require brazing at temperatures above 1300° F. Therefore, alloys suitable for brazing cutting elements with diamond layers have been limited to only a couple of alloys which offer low enough brazing temperatures to avoid damage to the diamond layer and high enough braze strength to retain cutting elements on cutting tools. Further, in most manual brazing processes, it is difficult to control the brazing temperature.

Brazing may offer a higher joint strength than soldering (a lower temperature metal joining process, typically occurring at temperatures below 840° F.) while maintaining physical properties of the base material better than welding (a higher temperature metal joining process, typically occurring at temperatures above 1830° F.). During brazing, localized heating occurs which, consequently, requires cooling to take place. Due to differences in material properties, variable alignment, and dealignment of different material grains, cracks may initiate at the interfaces between the braze metal, the weld metal, and tool body.

For tools using front loading cutting elements, the cutting element may be brazed to a cutter pocket by first placing a braze alloy on the back surface of the cutter pocket, then placing the cutting element in the cutter pocket so that the braze is in between the cutting element and the cutter pocket, and finally applying heat to the assembly so that the braze material flows to the side surface. Such brazing methods may optionally include a rotating step, wherein the cutting element is rotated within the cutter pocket during the heating step.

Alternatively, a cutting element (either front loading or top loading) may first be placed in the cutter pocket and the braze material may then be placed in or near the cutter pocket such that it may flow from the top of the cutting element to the bottom of the cutting element, between the cutting element and cutter pocket, when it is heated to melting temperature. In brazing techniques where the braze material flows from the top to the bottom of a cutting element, voids may form throughout the braze, resulting in a weaker joint between the cutting element and the cutter pocket. Some brazing processes may also include rotating the cutting element during the heating step to try to prevent voids from forming in the braze between the cutting element and the cutter pocket improve braze coverage. Braze coverage refers to the amount of surface area to be brazed that contacts the braze material. For example, if the braze contacts the entire surface of the inner wall of the cutter pocket and the entire surface of the cutting element being brazed to the cutter pocket, the braze is said to have 100% braze coverage. In other words, a braze having 100% braze coverage has no pockets or voids within the cutting element/braze interface or the cutter pocket/braze interface.

Other typical brazing techniques for front loading cutting elements may include wrapping a braze foil or braze wire around the cutting element before loading it into the cutter pocket. Any excess braze material may protrude from the cutter pocket. Heat may then be applied to melt the braze material and join the cutting element to the cutter pocket. This method is also typically used for top loading cutting elements.

Although braze coverage has been improved in prior art methods for brazing front loading cutting elements, a brazing method for top loading cutting elements has not yet been developed that allows for improved braze coverage and braze thickness. For example, it is difficult to get the same results rotating top loading cutting elements as with front loaded cutting elements because a top loaded cutting element will have cutter pocket walls on all sides of the top loaded cutting element except for the top and cutting portion. Accordingly, there exists a need for improved brazing for top loading cutting elements.

SUMMARY OF INVENTION

In one aspect, the embodiments disclosed herein relate to a method of brazing a top loading cutter into a cutter pocket that includes placing at least one braze disc between an inner wall of the cutter pocket and a portion of the top loading cutter and heating the at least one braze disc to a temperature above the melting temperature of the braze disc.

In another aspect, embodiments disclosed herein relate to a cutting tool having a tool body, at least one cutter pocket formed in the tool body, the at least one cutter pocket comprising an inner wall, a top loading cutter brazed into the at least one cutter pocket, and a braze material used to braze the top loading cutter to the at least one cutter pocket, wherein the braze material is disposed between the top loading cutter and the inner wall of the cutter pocket, and wherein the braze material has a thickness in the range of about 0.003 inches to about 0.01 inches.

Other aspects and advantages of the invention will be apparent from the following description and the appended claims.

DETAILED DESCRIPTION

In one aspect, embodiments disclosed herein relate to a brazing method for brazing top loading cutters to a cutter pocket. In another aspect, embodiments disclosed herein relate to a cutting tool having at least one top loading cutter brazed to a cutter pocket, wherein a braze material disposed between the cutter and cutter pocket has improved braze coverage and thickness.

Figure 1:
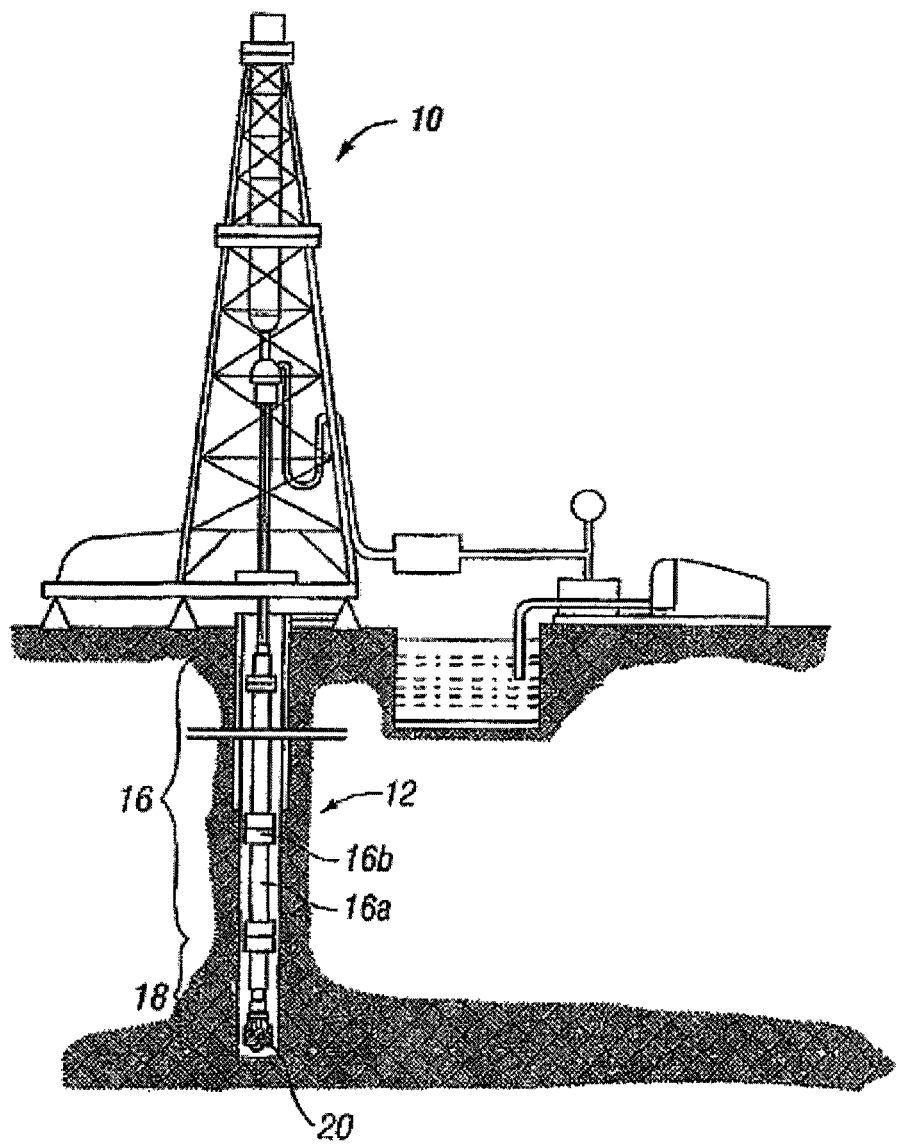
FIG. 1 is a schematic representation of a drilling operation.
Figure 2A:
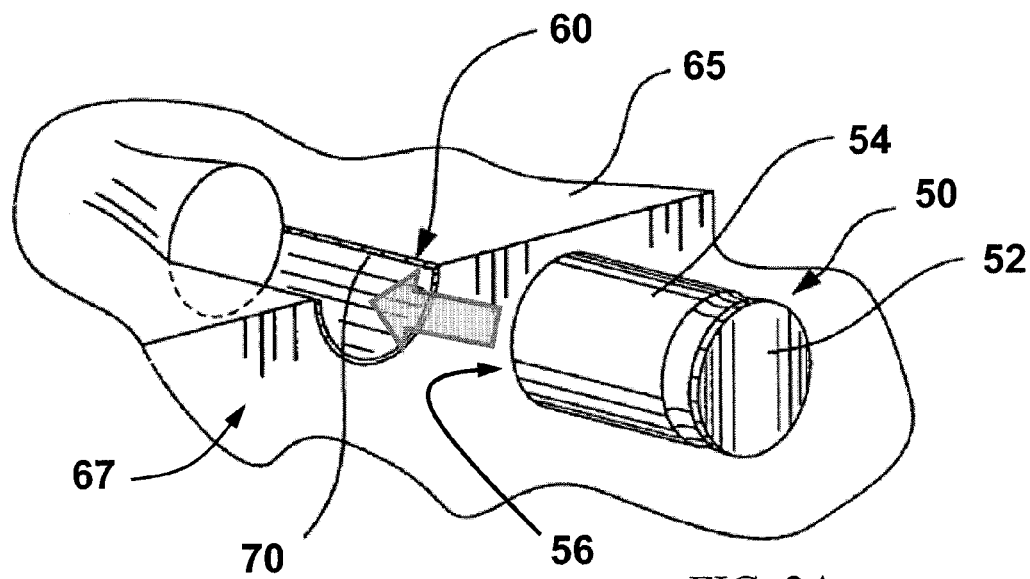
FIGS. 2A-B show exemplary embodiments of a front loading cutter and a top loading cutter.
Figure 2B:
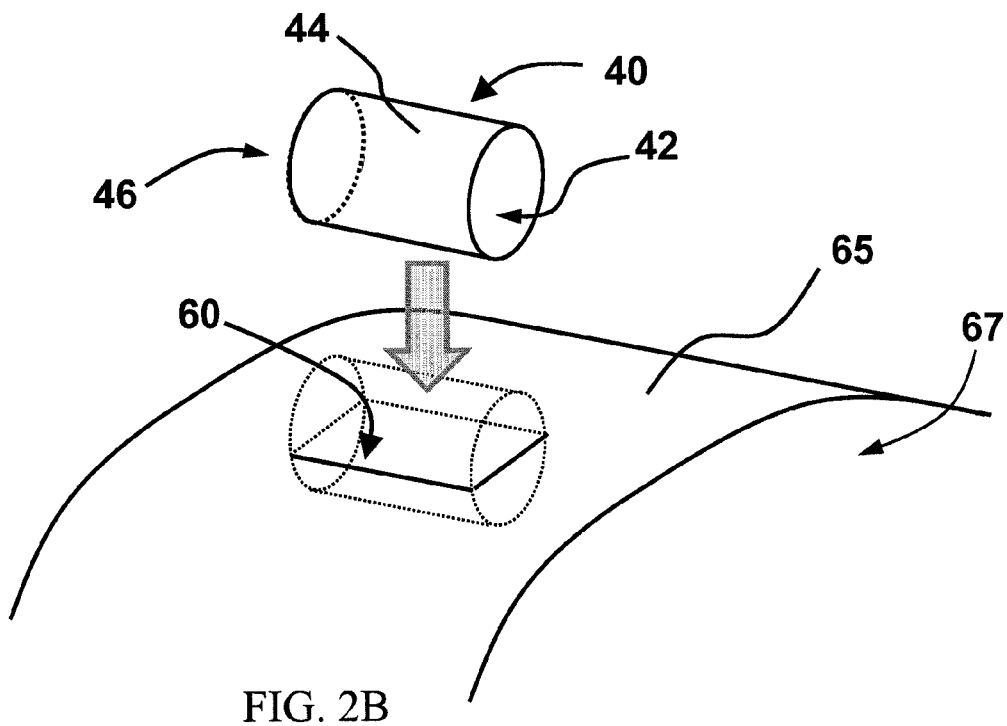

As referred to herein, a top loading cutter refers to a cutter that is loaded into a cutter pocket from the top of the tool, i.e., perpendicular to the cutter pocket. Front loading cutters, on the other hand, are cutters that are loaded into the front of a tool, or transverse to the cutter pocket. Because of the limitations imposed by each loading method, different brazing methods are generally used for top loading cutters and front loading cutters. Examples of a front loading cutter and top loading cutter are shown in FIGS. 2A and 2B, respectively. Referring to FIG. 2A, a front loading cutter 50 has a cutting face 52, a body 54, and a back side 56 opposite from the cutting face. The front loading cutter 50 is loaded into a cutter pocket 60 formed in the front of a drilling tool 65 (e.g., the blade of a drill bit) by inserting the back side 56 first into the cutter pocket 60. In the example of the front loading cutter 50, the cutter pocket 60 opens up to the leading face 67 of the blade 65 of a drilling tool. Thus, the cutter pocket 60 interfaces the cutter 50 along a portion of both the circumferential side surface of body 54 and back surface 56 of the cutter 50, and not along the cutting face 52. Further, as shown in FIG. 2A, a braze alloy 70 is disposed in the space between the cutter pocket 60 and the front loading cutter 50. However, front loading cutters may also be brazed to the cutting tool by applying a braze material after loading the front loading cutter into the cutter pocket. Referring now to FIG. 2B, a top loading cutter 40 has a cutting face 42, a body 44, and a back side 46 opposite from the cutting face 42. The top loading cutter 40 is loaded into a cutter pocket 60 formed in the top of a blade 65 on a drilling tool by placing the top loading cutter 40 into the cutter pocket 60 from the top of the blade 65. In the embodiment shown, cutter pocket 60 interfaces cutter 40 along a portion of each of the circumferential side surface of body 44, back surface 46, and cutting face 42. Further, referring to FIGS. 2A and 2B, the cutter pocket 60 of a top loading cutter 40 opens up to the top of the blade 65, whereas a cutter pocket 60 for a front loading cutter 50 opens up to the leading face 67 of the blade 65.

Figure 3A:
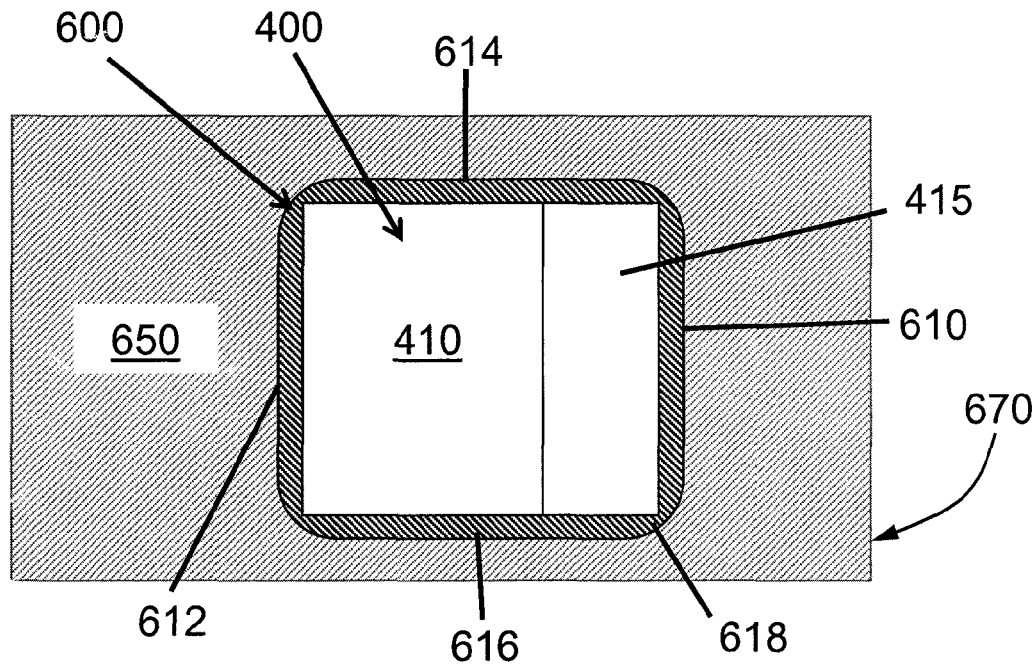
FIGS. 3A-B show a plan view and a cross-sectional view of a top loading cutter brazed to a cutter pocket according to the present disclosure.
Figure 3B:
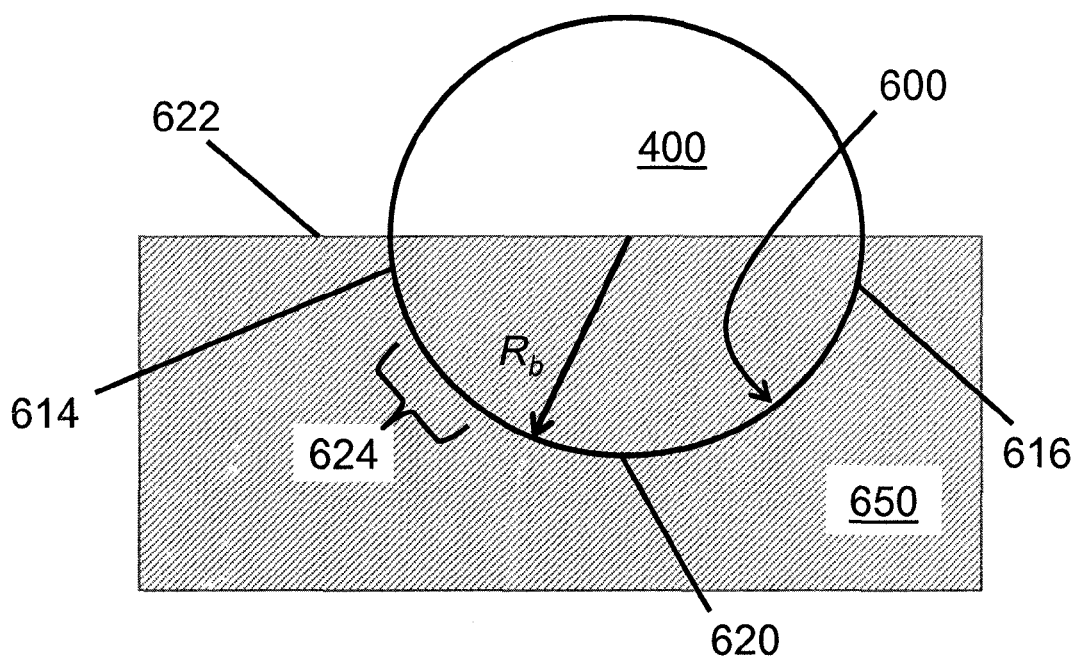

Another exemplary embodiment of a top loading cutter is shown in FIGS. 3A and 3B, wherein the top loading cutter 400 is disposed a cutter pocket 600 that has been formed in a drilling tool 650. Drilling tool 650 may include a drill bit, a secondary cutting structure, an hole englargement tool (such as a reamer), and/or a milling device, for example. The top loading cutter 400 includes a substrate 410 and an ultrahard layer 415, such as a polycrystalline diamond (PCD) or polycrystalline cubic boron nitride (PCBN) layer, wherein the ultrahard layer 415 is oriented facing the leading face 670 of a blade on a drilling tool 650. FIG. 3A shows the cutter pocket 600 in plan view, as seen from a viewing angle perpendicular to the surface of the drilling tool 650. The cutter pocket 600 includes an inner wall that has a bottom surface (not shown), a front wall 610 opposite a back wall 612, a first side wall 614 between the front wall 610 and back wall 612, and a second side wall 616 opposite the first side wall 614 and between front wall 610 and back wall 612. In plan view, the front wall 610, back wall 612, and first and second side walls 614, 616 may form a substantially rectangular shaped cutter pocket 600.

In select embodiments, first and second side walls 614, 616 may be planar or curved. Additionally, first and second side walls 614, 616 may intersect the front wall 610 and the back wall 612 at a substantially perpendicular angle. In certain embodiments, an arcuate portion 618 may be disposed at the intersection(s) of the front wall 610 and either or both of the side walls 614, 616. Additionally, an arcuate portion 618 may be disposed at the intersection(s) of the back wall 612 and either or both of the side walls 614, 616.

Referring to FIG. 3B, a front view of a cutter pocket 600 disposed in drilling tool 650 is shown. In the embodiment shown in FIG. 3B, a top loading cutter 400 is disposed in cutter pocket 600 having a bottom surface 620 substantially parallel to a surface 622 of drilling tool 650. As shown in FIG. 3B, the bottom surface 620 may be curved to accommodate a cylindrical top loading cutter 400, and in certain embodiments, the bottom surface 620 may have a substantially constant bottom radius, Rb, as shown. Further, a first side wall 614 and a second side wall 616 may be curved to accommodate the top loading cutter 400. A transition zone 624 may be located between the bottom surface 620 and at least one of the side walls 614, 616. In some embodiments, the first side wall 614, second side wall 616, and the bottom surface 620 may be substantially continuous with a substantially constant radius of curvature. One of ordinary skill in the art will appreciate that any of bottom surface 620 and the side surfaces 614, 616 may be planar.

Figure 4A:
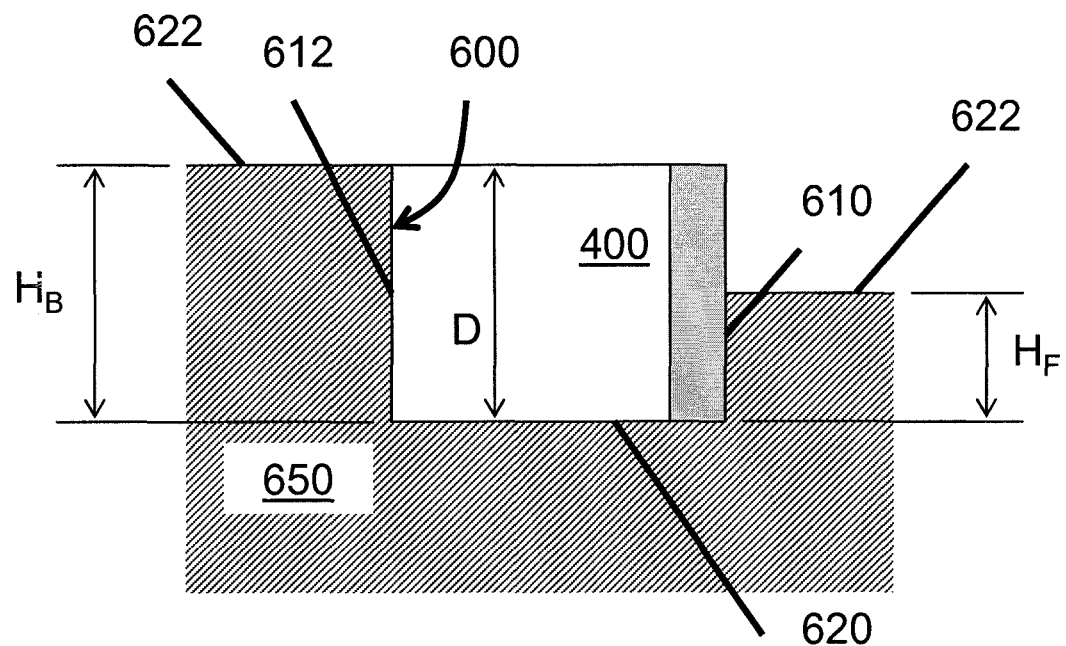
FIGS. 4A-B show cross-sectional views of embodiments according to the present disclosure.
Figure 4B:
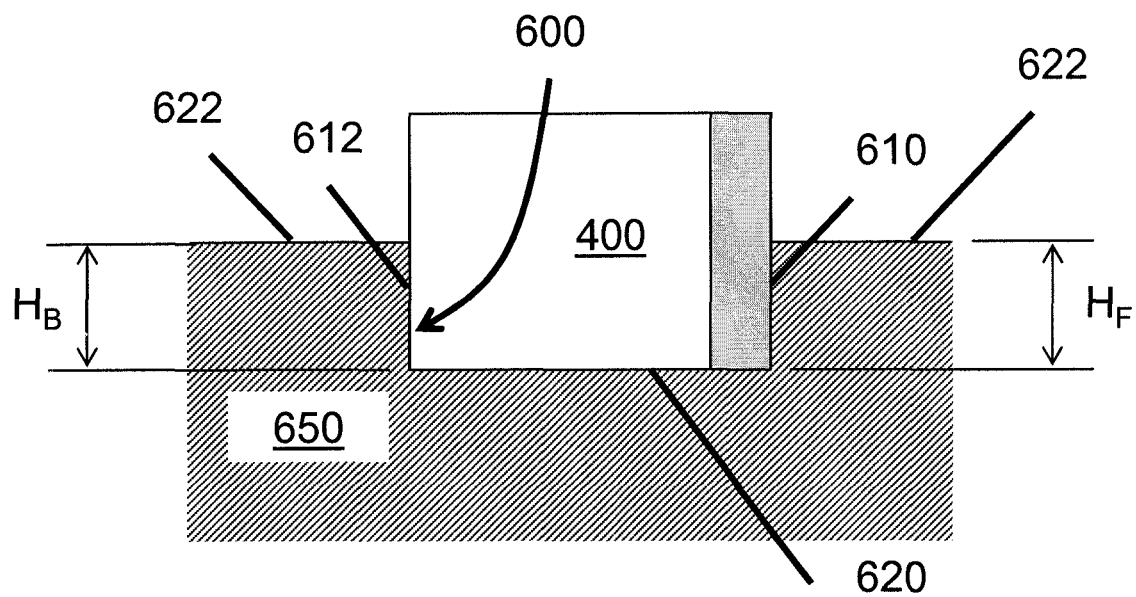

Referring now to FIGS. 4A and 4B, the front wall 610 and the back wall 612 of a cutter pocket 600 may extend the same or different heights from the bottom surface of the cutter pocket to the surface of the drilling tool 650. In FIG. 4A, the front wall 610 is shown having a front wall height $H_F$. Front wall height $H_F$ refers to the length of front wall 610 between the drilling tool surface 622 and the bottom wall 620 of the cutter pocket 600. The back wall 612 having a back wall height $H_B$ is also shown. Back wall height $H_B$ refers to the length of back wall 612 between tool surface 622 and bottom wall 620 of the cutter pocket 600. Back wall height $H_B$ may be substantially the same as a diameter D of top loading cutter 400. In other embodiments, the back wall height $H_B$ may be greater than the diameter D of top loading cutter 400. In certain embodiments, the front wall height $H_F$ is smaller than the back wall height $H_B$. For example, in certain embodiments the front wall height $H_F$ may be up to 25%, 50% and/or 75% smaller than the back wall height $H_B$. In other embodiments, as shown in FIG. 4B, the front wall height $H_F$ is the same as the back wall height $H_B$.

Figure 5:
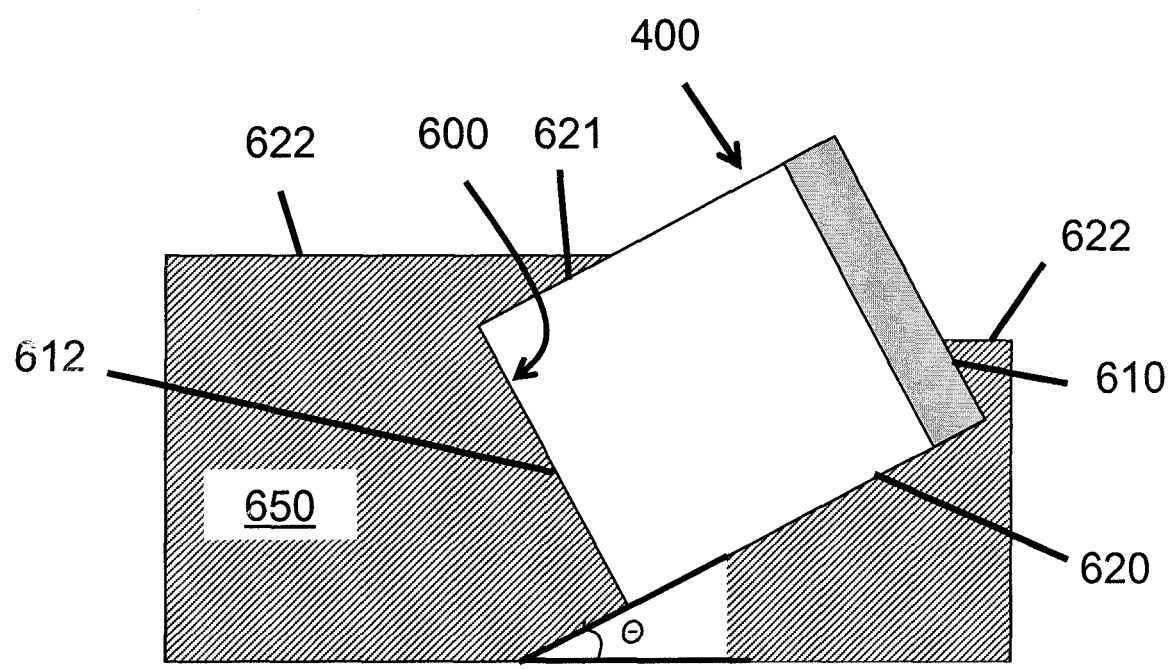
FIG. 5 shows a cross-sectional view of another embodiment according to the present disclosure.

According to some embodiments of the present disclosure, a top loading cutter may also be disposed in a cutter pocket having a top surface covering a portion of the top loading cutter, i.e., by surrounding the circumferential side surface of a cutter along the entire 360 degrees for some length of the side surface. Referring now to FIG. 5, a perspective view of a cutter pocket 600 formed in a drilling tool 650 and a top loading cutter 400 disposed therein are shown. A bottom wall 620 of the cutter pocket 600 is disposed between the front wall 610 and the back wall 612. The bottom wall 620 of the cutter pocket 600 may have a bottom surface angle θ relative to a surface 622 of drilling tool 650. In certain embodiments, the bottom surface angle θ may be about 30 degrees or less. In select embodiments, the front wall 610 may be substantially parallel to the back wall 612, as shown. Additionally, the bottom wall 620 may intersect the front wall 610 and back wall 612 at a substantially perpendicular angle, as shown. Those of ordinary skill in the art will appreciate that the bottom surface angle may be substantially the same as a back rake angle. Additionally, those of ordinary skill in the art will appreciate that a particular side rake may be achieved by forming cutter pocket 600 at a particular angle. Further, embodiments having a cutter pocket 600 with a bottom surface angle (or back rake angle) may also have a top wall 621 opposite the bottom wall 620 and partially covering the top loading cutter 400. In embodiments with cutter pockets 600 having a top wall 621, the top wall 621 may extend only as far over the top loading cutter 400 as possible to ensure that the top loading cutter 400 may still be loaded into the cutter pocket 600 from the top of the drilling tool 650.

Figure 6:
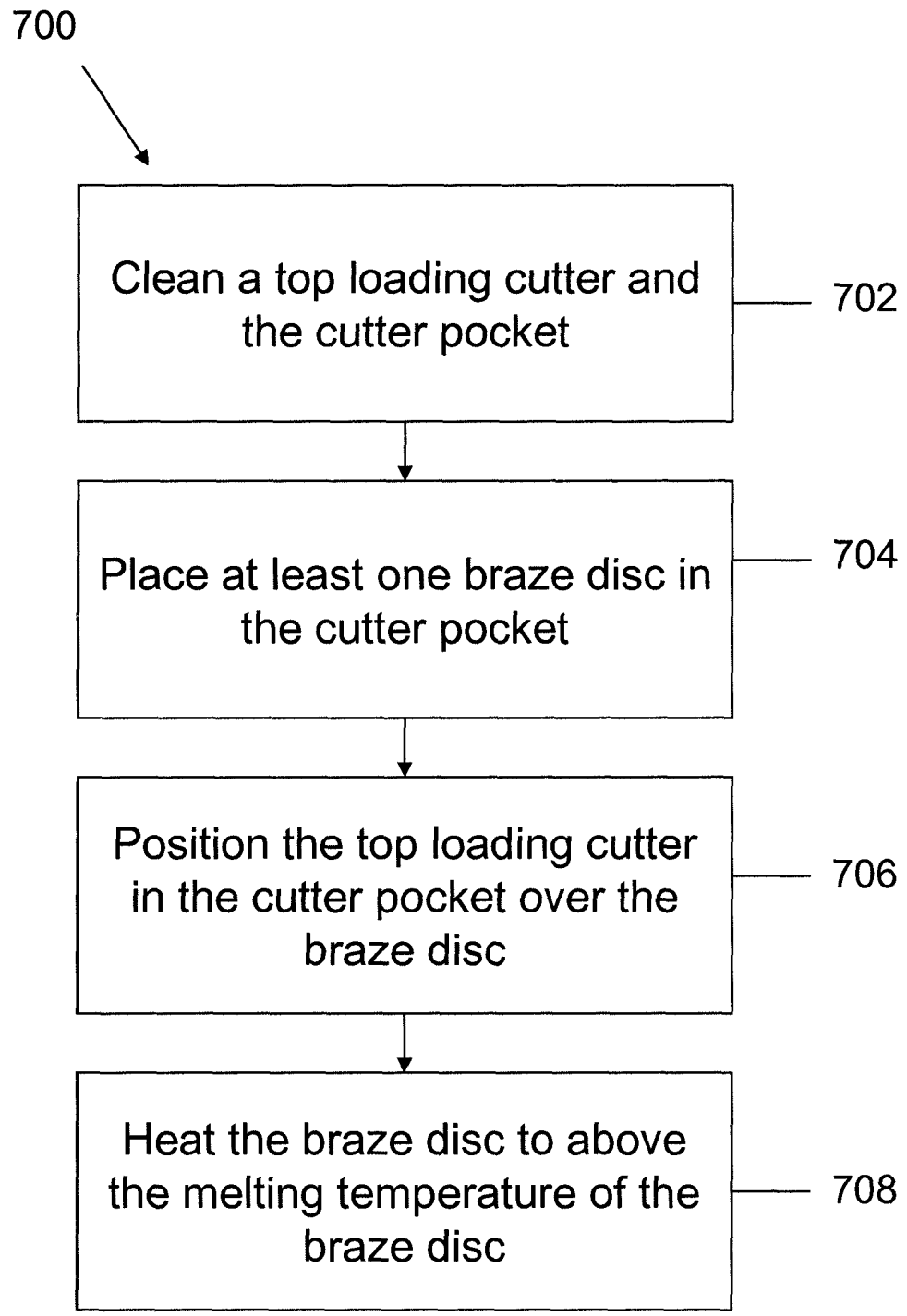
FIG. 6 shows a flow diagram of a brazing process in accordance with the embodiments disclosed herein.

Top loading cutters may be brazed to cutter pockets, such as the ones described in the embodiments above, according to the brazing methods described herein. Referring now to FIG. 6, a flow diagram including method steps for brazing a top loading cutter into a cutter pocket is shown. The brazing method 700 may include a cleaning step 702, wherein a top loading cutter and a cutter pocket are cleaned according to any cleaning means known in the art. At least one braze disc according to braze discs described herein may then be placed 704 in the cutter pocket. For brevity, "at least one braze disc" may also be referred to as "the braze disc" or "the braze discs." However, it should be appreciated that one or more braze discs may be used in the brazing methods described herein, depending on the size and shape of the braze discs, the size and shape of the cutter pocket, etc. The top loading cutter may then be positioned 706 over the braze disc such that the braze disc is between at least the bottom wall of the cutter pocket and a portion of the top loading cutter. A heating step 708 may then be conducted, wherein the braze disc is heated to a temperature above the melting temperature of the braze disc. The heating step 708 may include heating the braze disc by any means known in the art, such as induction heating, torch heating, or furnace heating, microwave heating, vacuum heating, for example.

The Cleaning Step

The cleaning step according to embodiments of the present disclosure may include any method known in the art for cleaning the surfaces to be joined, so long as the surfaces are cleaned sufficiently to allow for proper capillary action of the melted braze material between the top loading cutter and the cutter pocket. If the surfaces to be joined (i.e., a top loading cutter and cutter pocket) have contaminants (e.g., dirt, grease, etc.) thereon, those contaminants may form a barrier between the surfaces to be joined and the braze material. Examples of conventional cleaning methods include, dipping the components to be joined in degreasing solvent, vapor degreasing, alkaline or aqueous cleaning, chemical treatments such as acid pickle treatment, mechanical contaminant removal treatments such as scrubbing or grit blasting, etc.

In some embodiments, a pre-braze set up step may also be included after the cleaning step 702 and before placing 704 the braze disc into the cutter pocket. The pre-braze set up step may include applying a flux material to the inner wall of the cutter pocket. A flux material is a chemical compound, typically including materials such as boron, boron compounds, fluorite, borite, etc. Flux material may be chosen based on the material of the components to be joined, the brazing material, and the brazing temperature and conditions. By applying a flux material to at least a portion of the surfaces to be joined, the flux material may prevent oxide formation during the brazing step, which may inhibit the braze material from wetting and completely bonding to the surface to be joined.

Placing the Braze Disc in the Cutter Pocket

Braze discs of the present disclosure may be made of a material selected from at least one of silver, copper, nickel, iron, gold, and alloys thereof. In particular, braze material used to make braze discs of the present disclosure may be a material that has a melting temperature lower than that of the cutter pocket material and the top loading cutter. For example, base metals for a braze alloy may be selected from silver, copper, gold, and nickel, while alloys may also include as other constituents at least one of tin, zinc, titanium, zirconium, nickel, manganese, tellurium, selenium, antimony, bismuth, gallium, cadmium iron, silicon, phosphorous, sulfur, platinum, palladium, lead, magnesium, germanium, carbon, oxygen, as well as other elements. Generally, gold-, nickel-, and copper-based alloys may be used as high temperature braze materials, whereas silver-based alloys typically may have braze temperatures of less than or more than 700° C. In some preferred embodiments, silver alloy braze materials may be used, including BAG-7, BAG-22, BAG-24, and BrazeTec-5662.

Further, braze discs of the present disclosure may have different shapes (circular discs, square, rectangular, or other polygonal discs, etc.) and sizes. For example, braze discs may be round, rectangular, or other shape capable of covering the bottom wall of a cutter pocket. Additionally, according to some embodiments, braze discs of the present disclosure may have a thickness ranging from 0.010 to 0.10 inches. In a preferred embodiment, a braze disc has a thickness range of 0.04 to 0.06 inches. However, other embodiments may allow for a thickness having a lower limit of any of 0.01, 0.02, 0.03, 0.04, 0.05, or 0.06 inches to an upper limit of any of 0.05, 0.06, 0.07, 0.08, 0.09, or 0.10 inches. However, other sizes and shapes of braze discs may be used, depending, for example, on the cutter pocket and cutter size, number of braze discs being used, etc. Upon heating, the braze material or joint bonding the cutter to the cutter pocket may have a thickness ranging from 0.003 to 0.01 inches.

Figure 7A:
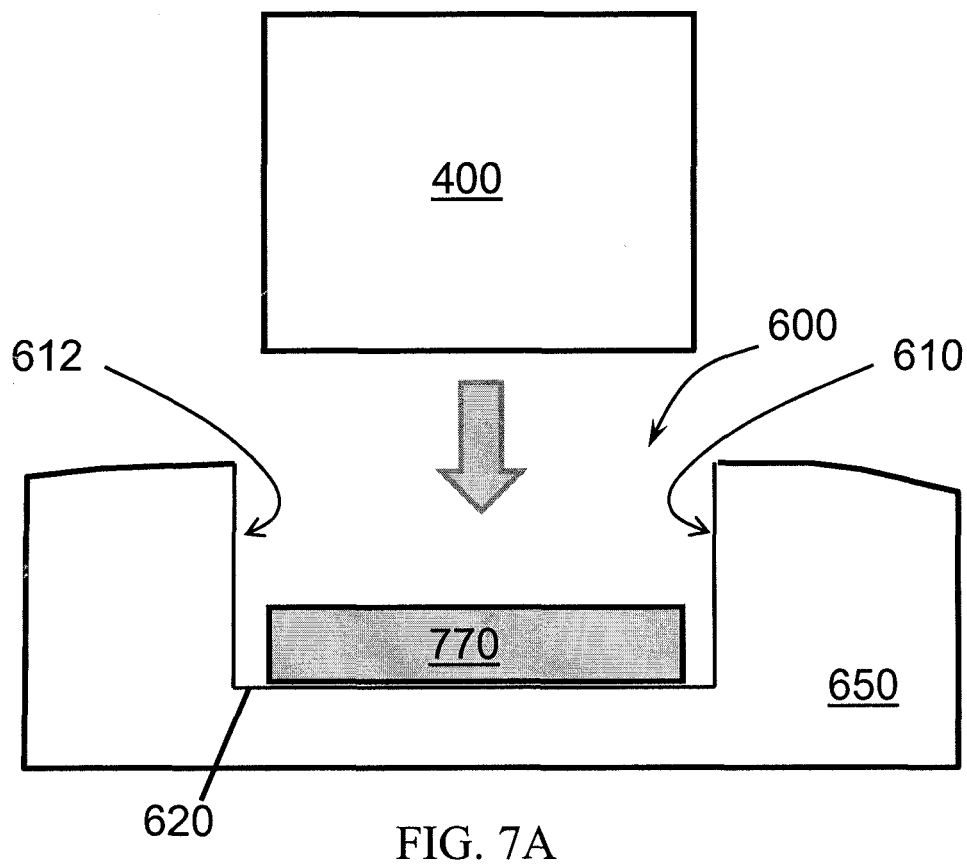
FIGS. 7A-B show a cross-sectional view of a top loading cutter brazed to a cutter pocket according to embodiments of the present disclosure.

Referring now to FIG. 7A, a side cross-sectional view of an exemplary embodiment of a braze disc placed in a cutter pocket is shown. A cutter pocket 600 having a front wall 610, a back wall 612 opposite from the front wall, side walls (not shown), and a bottom wall 620 is formed in a cutting tool 650. A braze disc 770 is placed on the bottom wall 620 of the cutter pocket 600. The braze disc 770 has a thickness T and extends from the front wall 610 to the back wall 612 of the cutter pocket 600. In other embodiments, the braze disc may be smaller than the length and/or width of the cutter pocket.

Figure 8A:
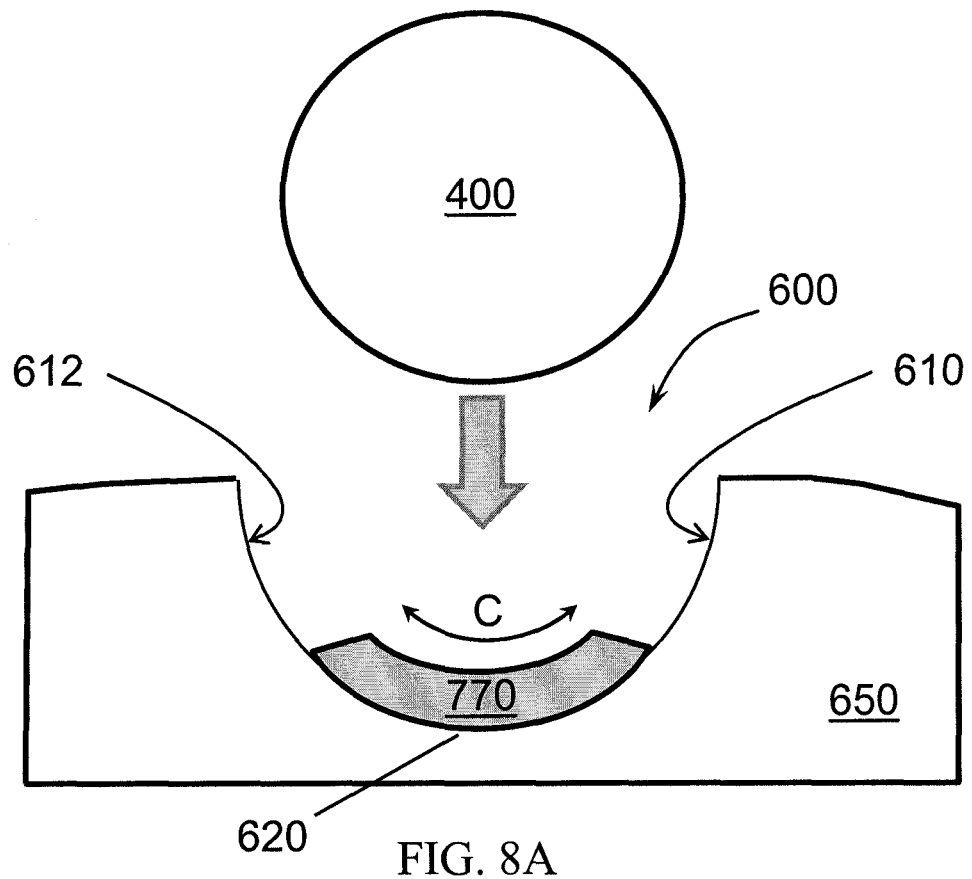
FIGS. 8A-B show a cross-sectional view of a top loading cutter brazed to a cutter pocket according to other embodiments of the present disclosure.

A braze disc according to some embodiments of the present disclosure may be curved. Referring now to FIG. 8A, a front cross-sectional view of an exemplary embodiment of a curved braze disc placed in a cutter pocket is shown. A cutter pocket 600 having a first side wall 614 and a second side wall 616 opposite from the first side wall, and a bottom wall 620 is formed in a cutting tool 650. As shown, the cutter pocket 600 has curved side and bottom walls 614, 616, 620. A curved braze disc 770 may be placed on the bottom wall 620 of the cutter pocket 600, wherein the braze disc 770 has a radius of curvature C. The radius of curvature C may be substantially equal to the curve of the bottom wall 620 of the cutter pocket 600. In other embodiments, the radius of curvature C may be different from the curvature of the cutter pocket walls.

Additionally, more than one braze disc may be placed in a cutter pocket. For example, referring to FIG. 9A, two circular braze discs 770 are placed in the bottom of a cutter pocket 600. The braze discs 770 are placed in the cutter pocket 600 such that at least a portion of each braze disc overlap. In other embodiments, braze discs may be small enough that they do not overlap. Further, the braze discs 770 shown in FIG. 9A have equal diameters. However, in other embodiments, more than one braze disc may be placed in a cutter pocket wherein each braze disc has a different sized diameter. Further, in embodiments having more than one braze disc, each braze disc may all have the same shape, or alternatively, the braze discs may have different shapes.

Positioning the Top Loading Cutter

Once at least one braze disc has been placed in the cutter pocket, a top loading cutter may then be positioned over the braze disc within the cutter pocket. A top loading cutter may include primary or secondary cutters, as long as they are top loading, and may be used for back-up cutters, drilling mills, drag bits, impregnated drill bits, hybrid drill bits, and reamers for example. Referring back to FIGS. 7A and 7B, an exemplary embodiment of positioning a top loading cutter over a braze disc in a cutter pocket is shown. As shown, a cutter pocket 600 is formed in a drilling tool 650. The cutter pocket 600 is cleaned and a braze disc 770 is placed within the cutter pocket 600. A top loading cutter 400 may then be positioned over the braze disc 770 within the cutter pocket 600. FIGS. 8A and 8B show another exemplary embodiment of positioning a top loading cutter over a braze disc in a cutter pocket. As shown, a cutter pocket 600 having curved side walls 614, 616 and a curved bottom wall 620 is formed in a drilling tool 650. The cutter pocket 600 is cleaned and a braze disc 770 having a radius of curvature C is placed within the cutter pocket 600. A top loading cutter 400 may then be positioned over the braze disc 770 within the cutter pocket 600.

The Heating Step (Brazing)

During the heating step, the braze disc according to the present disclosure is heated to above its melting point, and once in molten form, is distributed between the top loading cutter and the cutter pocket by capillary action (i.e., the braze material flows from the bottom to the top of the cutter pocket). Thus, while prior art brazing processes rely on braze material flowing from the top to the bottom of a cutter pocket and cutting element (which may generate voids in the braze joint), the brazing technique of the present disclosure relies on braze material flowing from the bottom to the top of a cutter pocket and cutting element, thus eliminating a potential for void formation. Advantageously, the capillary action of the braze material may also alleviate the need to rotate the cutting element during the heating stage. The top loading cutter and cutter pocket, which may also be referred to as base components, are joined when the molten braze material cools and hardens. Because the base components are not melted by brazing, they typically retain most of their physical properties and the danger of metal distortion or warping, associated with welding, is minimized.

Additionally, unlike soldering, brazing provides a strong metallic bond between the braze alloy and components being joined. The melting range for a brazing alloy is defined by the minimum temperature at which the alloy will start to melt ("solidus") and the temperature at which the alloy is 100% liquid ("liquidus"). For most purposes, the actual brazing temperature is 50° F. to 200° F. (30° C. to 110° C.) above the liquidus temperature. Thus, reference to specific temperatures may refer to the braze temperature, and not just a melting temperature, in particular, as it is the braze temperature which is necessary to form a braze. However, reference to melting temperatures may generally refer to whether a material melts at, and thus requires, a higher or lower applied temperature (braze temperature).

According to embodiments of the present disclosure, a braze disc may be heated to a braze temperature to join a top loading cutter within a cutter pocket by any means known in the art. For example, the braze material may be heated using a torch, or by placing the assembly in a furnace.

Figure 7B:
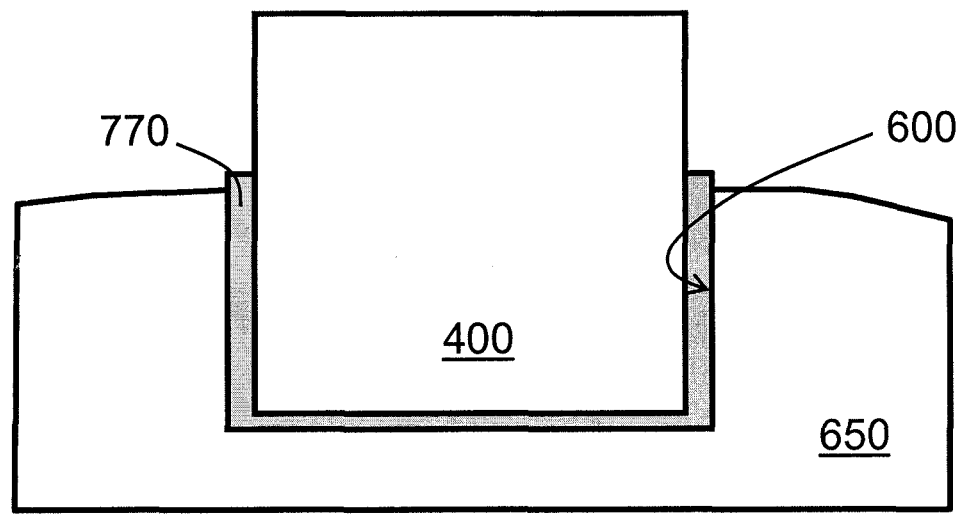
Figure 8B:
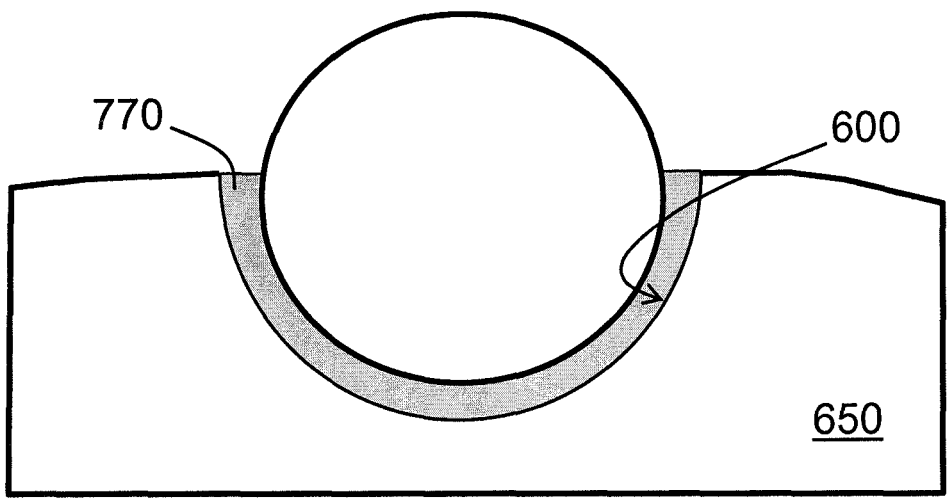

An exemplary embodiment of a top loading cutter brazed to a cutter pocket is shown in FIG. 7B. As shown, a top loading cutter 400 has been positioned over a braze disc 770 within a cutter pocket and heated to a brazing temperature (i.e., a temperature above the melting point of the braze material) of the braze disc 770. Once in molten form, the braze material 770 is distributed between the top loading cutter 400 and the cutter pocket 600 by capillary action. The top loading cutter 400 and cutter pocket 600 are joined when the molten braze material 770 cools and hardens.

Once a top loading cutter has been brazed to a cutter pocket, a second cleaning step may be preformed on the joint. A second cleaning step may include removal of any remaining flux residue (e.g., rinsing the joint with water) and removal of any oxides formed during the brazing process (e.g., submersing the joint in a chemical solution used for oxide removal).

The inventors of the present disclosure have found that by placing a braze disc between the cutter pocket and the top loading cutter and heating the assembly, the brazing process may be automated while also allowing for improved braze coverage and more uniform braze thickness when compared to conventional top loading cutter brazing processes, which generally involve using only braze wire. Advantageously, distribution of braze material by capillary action according to embodiments of the present invention provides a method of brazing cutting elements to cutter pockets having increased braze coverage and uniform braze thickness without rotating the cutting elements, as required in some conventional brazing methods.

As shown in FIGS. 9A through 17, three brazing processes were compared, two conducted by brazing methods according to the present disclosure and one conducted by a conventional wire brazing method. Samples prepared using one brazing process according to the present disclosure are referred to herein as case A and samples prepared using another brazing process according to the present disclosure are referred to herein as case B. In particular, case A samples were prepared using two circular braze discs, each having a braze disc thickness of 0.05 inches. Case B samples were prepared using one square braze disc having a braze disc thickness of 0.05 inches. Samples that were prepared using a conventional wire brazing method, wherein a braze wire is fed between the top loading cutter and cutter pocket during the brazing process, are referred to herein as case C.

The methods and results of a case study of cases A-C is discussed below. According to the exemplary case study, three top loading cutters per case (case A, B, and C) were brazed in a coupon representing a drilling tool having nine cutter pockets, which is partially shown in FIG. 17.

Figure 9A:
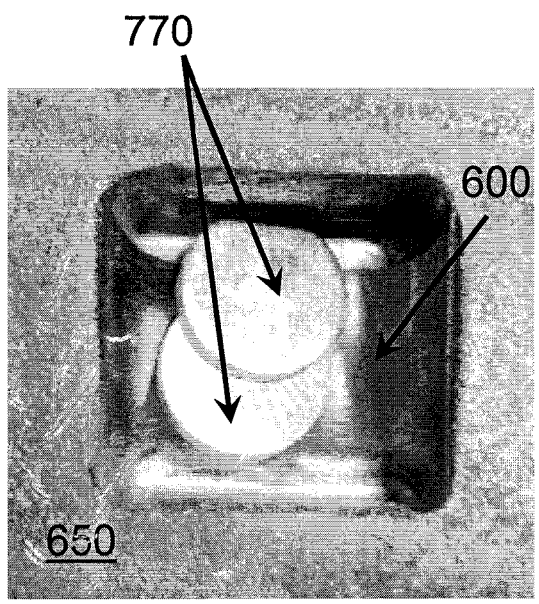
FIGS. 9A-C show exemplary embodiments of samples used for three case studies.
Figure 9B:
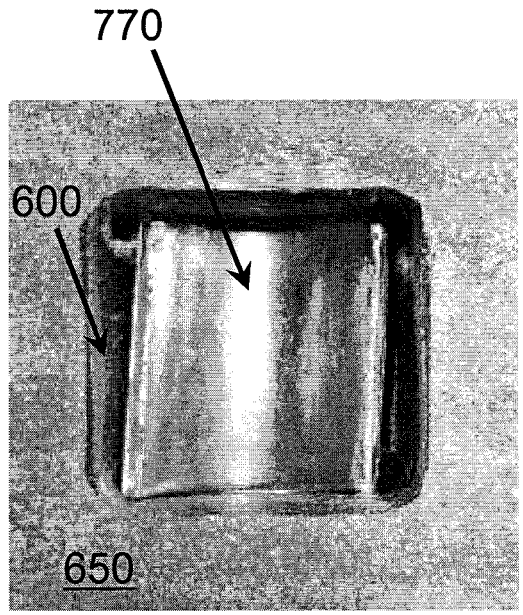
Figure 9C:
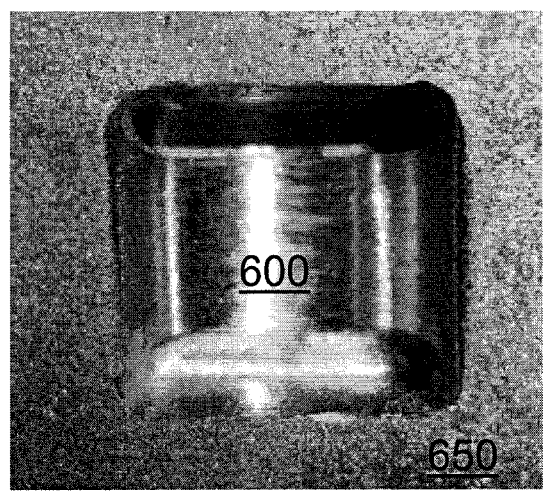

Referring now to FIGS. 9A-C, cutter pockets 600 were cleaned and prepared for top loading cutters to be brazed therein. FIG. 9A shows a cutter pocket 600 that has been cleaned and prepared for a top loading cutter to be brazed therein using the brazing method conducted for case A samples. In particular, two circular braze discs 770, each having a braze disc thickness of about 0.05 inches, were placed in a cleaned and prepared cutter pocket 600 formed in a coupon 650 representing a drilling tool. As shown in FIG. 9B, a rectangular braze disc 770 having a braze disc thickness of about 0.05 inches was placed in a cleaned and prepared cutter pocket 600 according to the brazing method of case B samples. FIG. 9C shows a cutter pocket 600 formed in a coupon 650 representing a drilling tool according to the brazing method of case C samples.

Figure 10A:
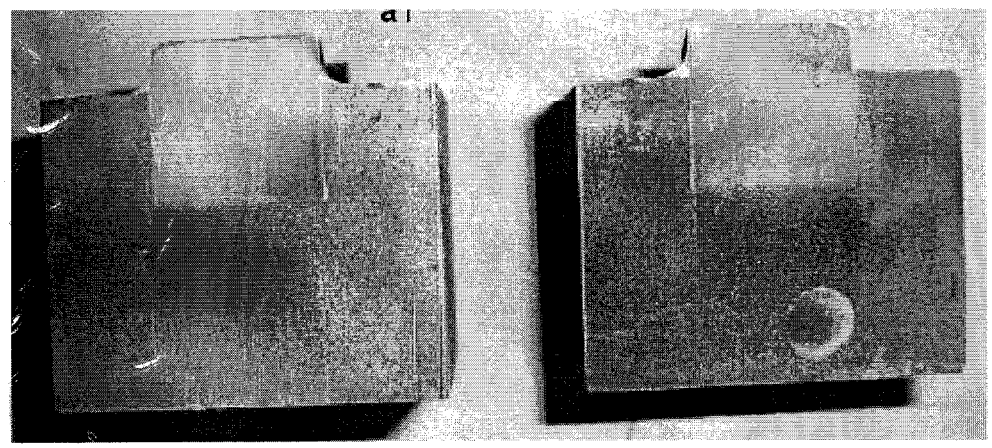
FIGS. 10A-C show cross-sectional views of samples prepared for case A.
Figure 10B:
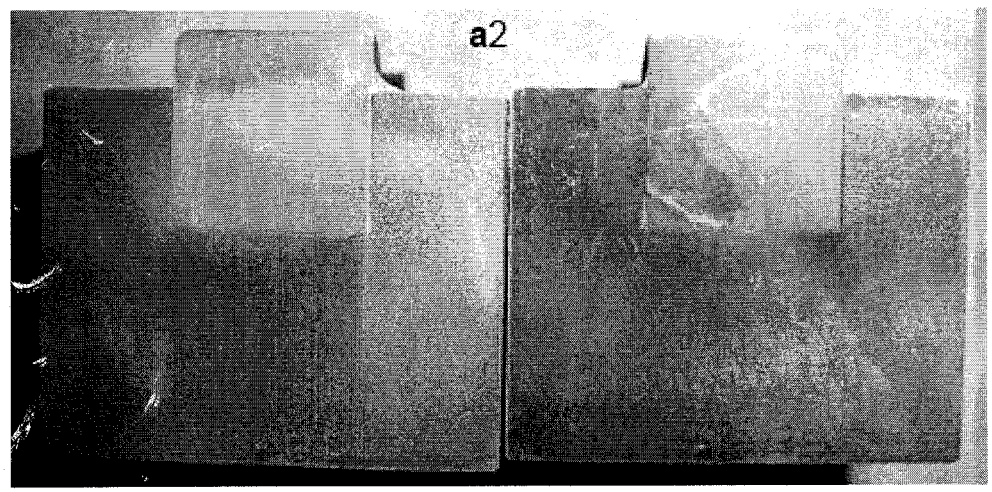
Figure 10C:
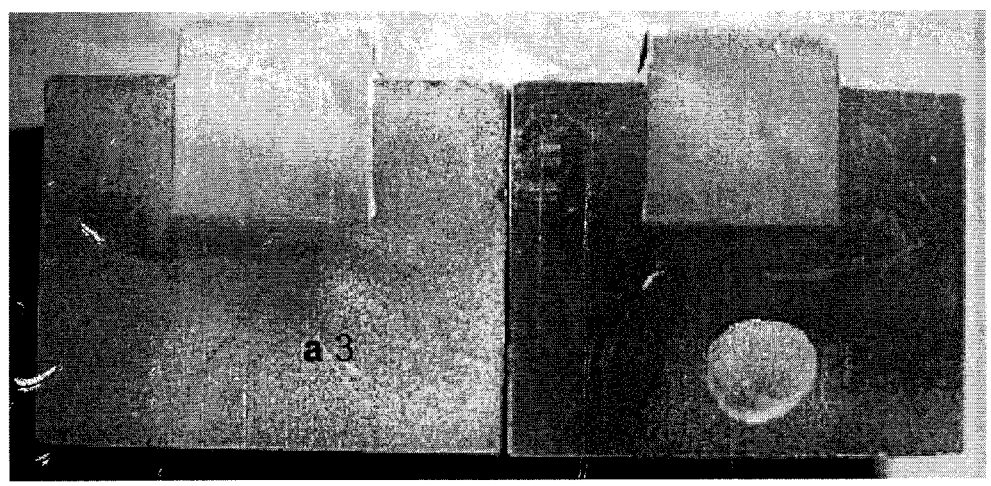
Figure 11A:
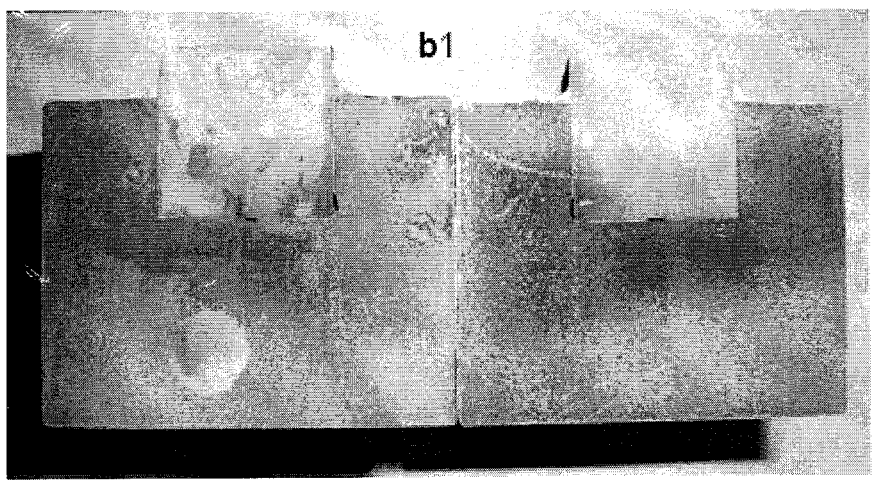
FIGS. 11A-C show cross-sectional views of samples prepared for case B.
Figure 11B:
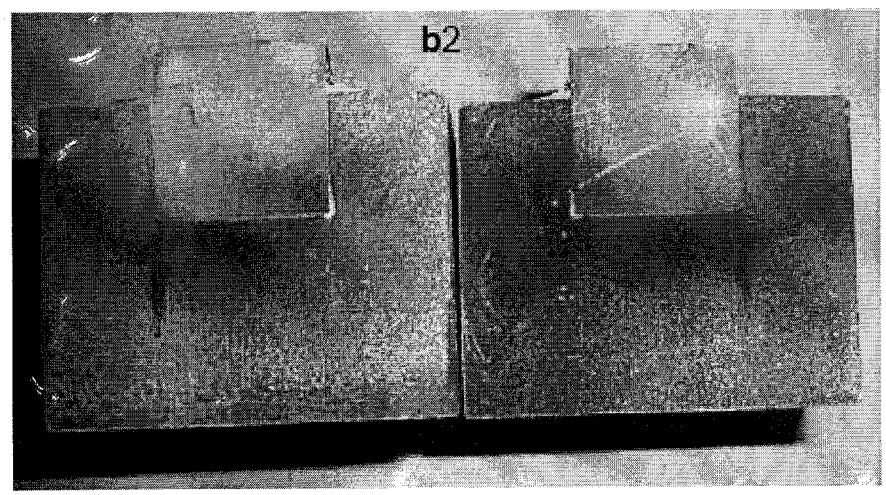
Figure 11C:
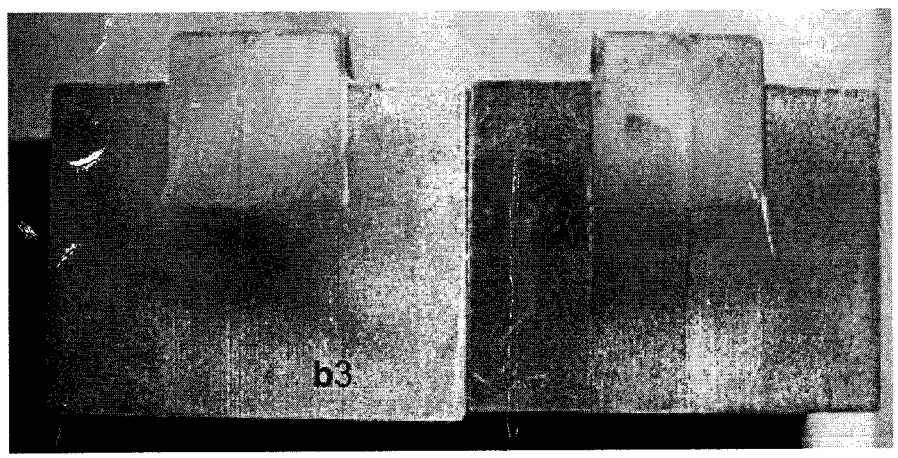
Figure 12A:
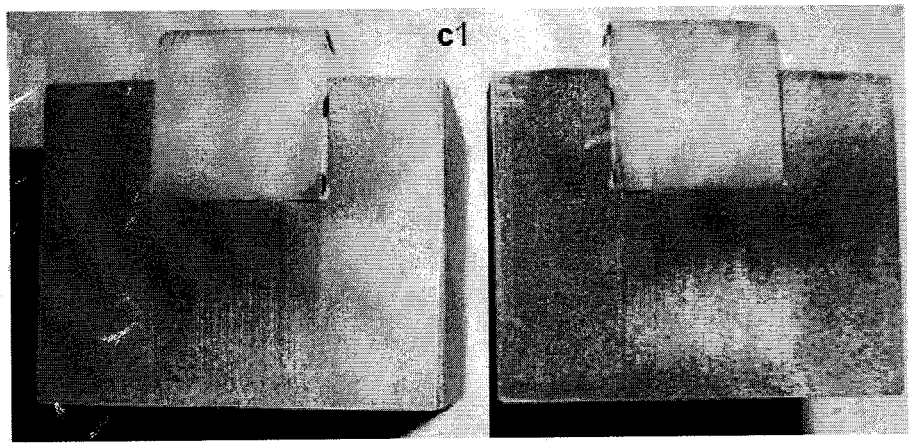
FIGS. 12A-C show cross-sectional views of samples prepared for case C.
Figure 12B:
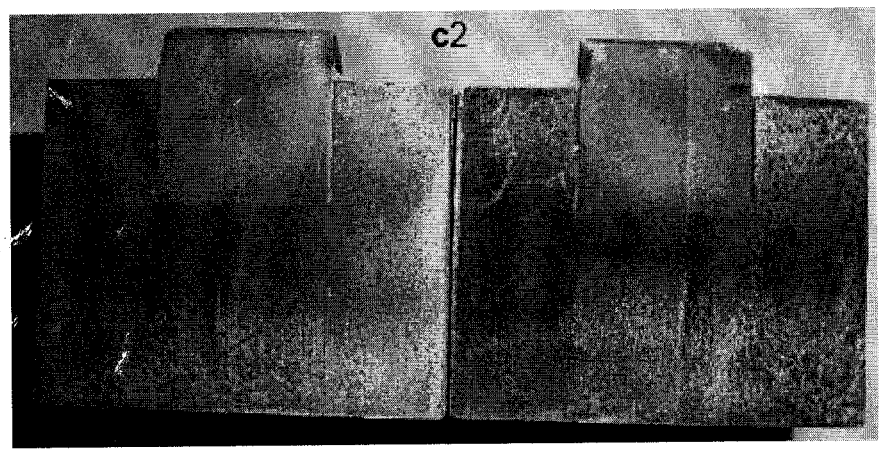
Figure 12C:
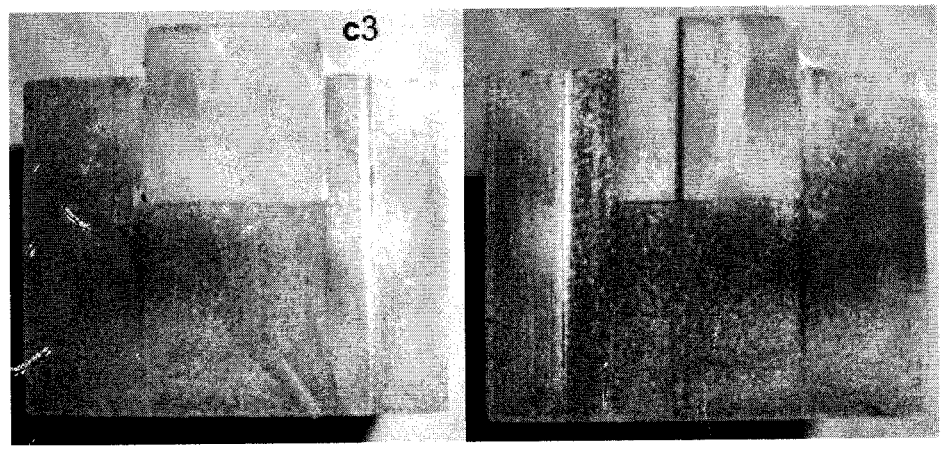

Once the cutter pockets were cleaned and prepared, and in cases A and B once braze discs according to the present disclosure were placed in the cutter pockets, a top loading cutter was positioned in the cutter pockets. The samples prepared for cases A and B were then heated to melt the braze discs and join the top loading cutters to the cutter pockets while the samples prepared for case C were brazed using a conventional wire brazing method. Samples from each case were then sectioned using an EDM, which are shown in FIGS. 10A-12C. In particular, FIGS. 10A-C show samples from case A made according to an exemplary method of the present disclosure, FIGS. 11A-C show samples from case B made according to another exemplary method of the present disclosure, and FIGS. 12A-C show samples from case C made according to a conventional wire brazing method.

Figure 13A:
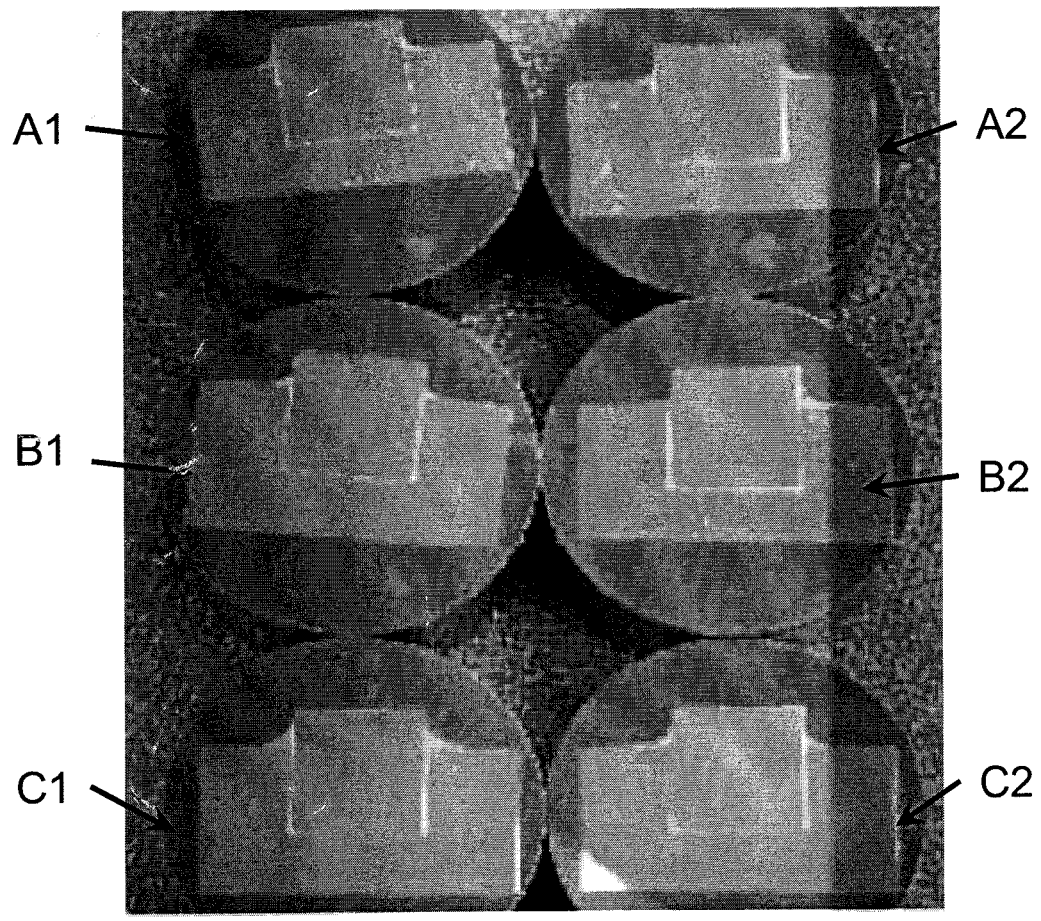
FIGS. 13A-B show cross-sectional views of samples used for three case studies.
Figure 13B:
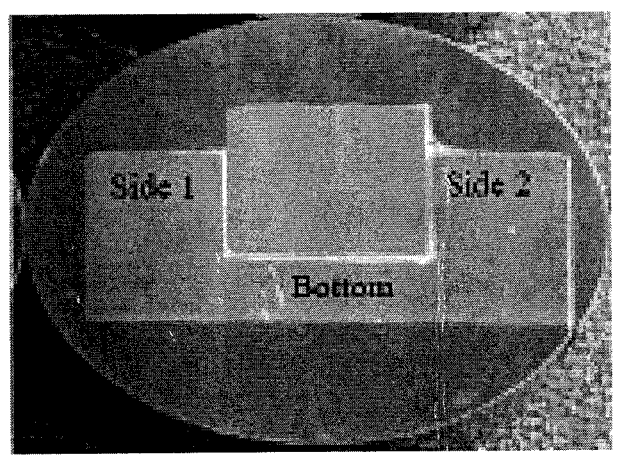

Two samples from each of cases A-C, which are shown in FIG. 13A, were evaluated to determine average braze thickness and coverage. Specifically, the average braze thickness between the top loading cutter and the cutter pocket was measured along the bottom wall of the cutter pocket and along two opposite sides of the cutter pocket. Referring to FIG. 13B, the braze thickness between the top loading cutter and the cutter pocket was measured along Side 1, Side 2, and the bottom wall. The results of the average braze thickness and coverage are shown below in Table 1.

TABLE 1

| Sample ID | A1 | A2 | B1 | B2 | C1 | C2 |
|---|---|---|---|---|---|---|
| Braze Coverage (%) | 100 | 97 | 92 | 97 | 60 | 100 |
| Braze Thickness (inches): | | | | | | |
| Average for side wall 1 | 0.0061 | 0.0038 | 0.0031 | 0.0046 | 0.0023 | 0.0023 |
| Average for side wall 2 | 0.0039 | 0.0059 | 0.0059 | 0.0093 | 0.0148 | 0.0078 |
| Average for bottom wall | 0.0078 | 0.0070 | 0.0060 | 0.0150 | 0.0059 | 0.0059 |

As seen in Table 1, top loading cutters that were brazed using a method according to the present disclosure (A and B samples) showed excellent braze coverage while maintaining optimal braze thickness. Optimal braze thickness may range from about 0.0025 to 0.005 inches, and preferably about 0.003 inches. Braze thicknesses above about 0.01 inches result in decreased braze strength. The top loading cutters brazed using a conventional braze wire method (C samples), on the other hand, show less consistent braze thickness and braze coverage. In particular, sample C1 had 60% braze coverage while sample C2 had 100% braze coverage. Such differences in the percentage of braze coverage in samples that were brazed using a conventional wire brazing method may result from variances in the skill of the brazing operator. Further, braze thicknesses of samples that were brazed using a conventional method range from 0.0023 inches to greater than 0.01 inches. As mentioned above, samples having braze thicknesses of greater than 0.01 inches have a decreased braze strength.

Figure 14A:
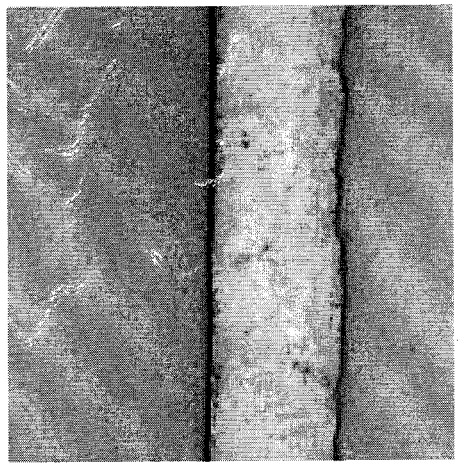
FIGS. 14A-D show photomicrographs of the braze thicknesses and coverage of a sample prepared for case A at higher magnifications.
Figure 14B:
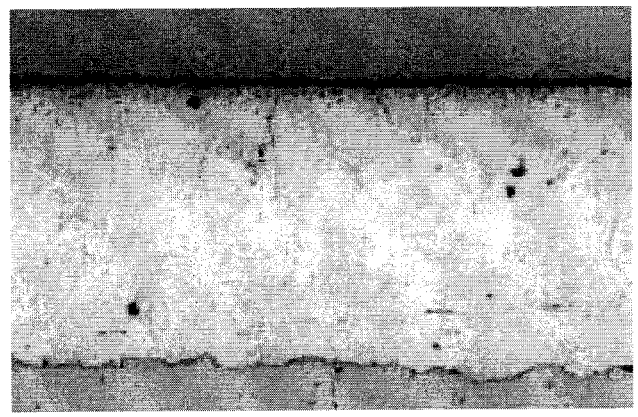
Figure 14C:
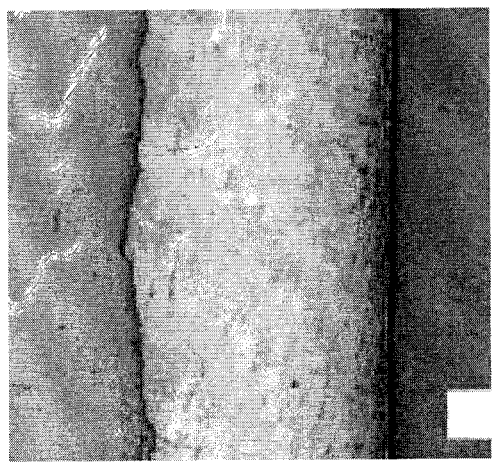
Figure 14D:
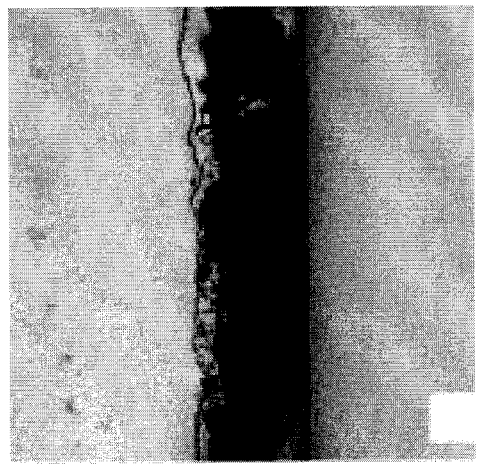

Referring now to FIGS. 14A-D, photomicrographs showing the braze thicknesses and coverage of a sample prepared for case A at higher magnifications are shown. Specifically, FIG. 14A shows the braze joint along Side 1 of sample A2 at a 200× magnification. FIG. 14B shows the braze joint along the bottom wall of sample A2 at a 200× magnification, and FIG. 14C shows the braze joint along Side 2 of sample A2 at a 200× magnification. FIG. 14D is a photomicrograph taken at a lower magnitude (100×) to show the porosity of the braze joint along Side 2 of sample A2.

Figure 15A:
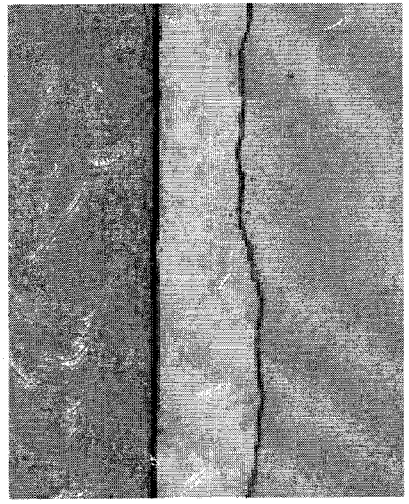
FIGS. 15A-D show photomicrographs of the braze thicknesses and coverage of a sample prepared for case A at higher magnifications.
Figure 15B:
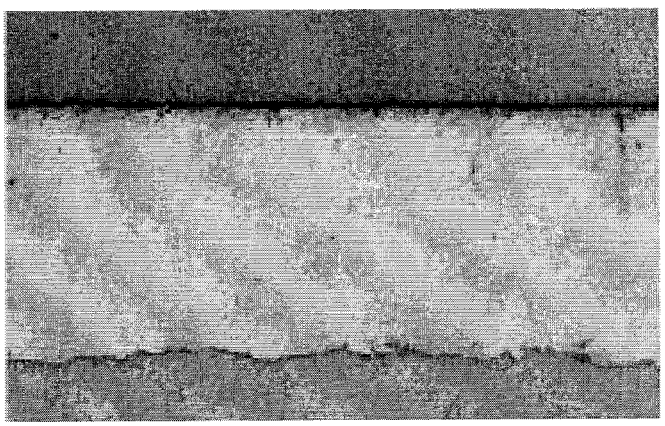
Figure 15C:
Figure 15D:
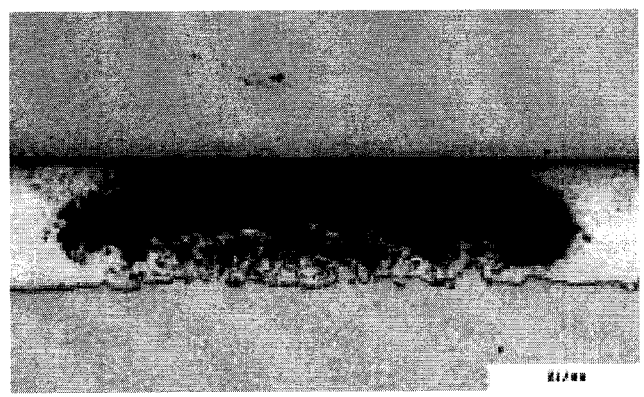

Similarly, FIGS. 15A-D show photomicrographs of the braze thicknesses and coverage of a sample prepared for case B at high magnifications. Specifically, FIG. 15A shows the braze joint along Side 1 of sample B1 at a 200× magnification. FIG. 15B shows the braze joint along the bottom wall of sample B1 at a 200× magnification, and FIG. 15C shows the braze joint along Side 2 of sample B1 at a 200× magnification. FIG. 15D is a photomicrograph taken at a lower magnitude (100×) to show porosity and slag within the braze joint along the bottom wall of sample B1.

Figure 16A:
FIGS. 16A-D show photomicrographs of the braze thicknesses and coverage of a sample prepared for case A at higher magnifications.
Figure 16B:
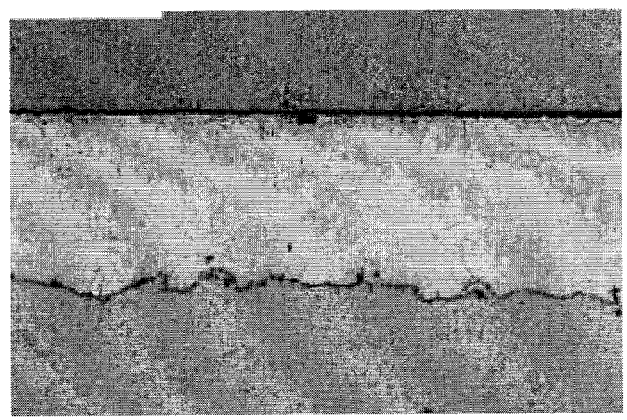
Figure 16C:
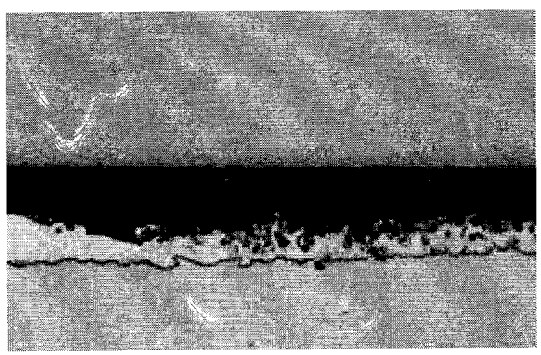
Figure 16D:
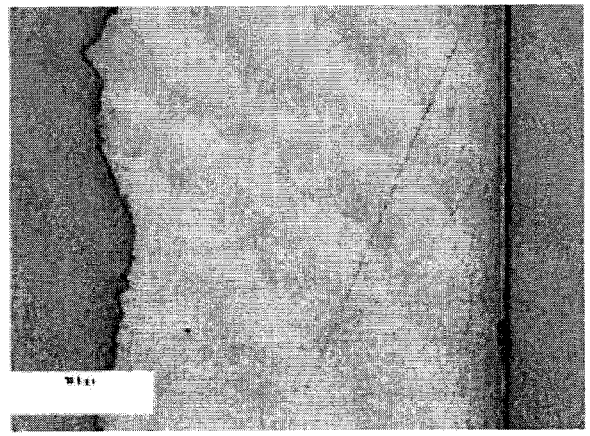
Figure 17:
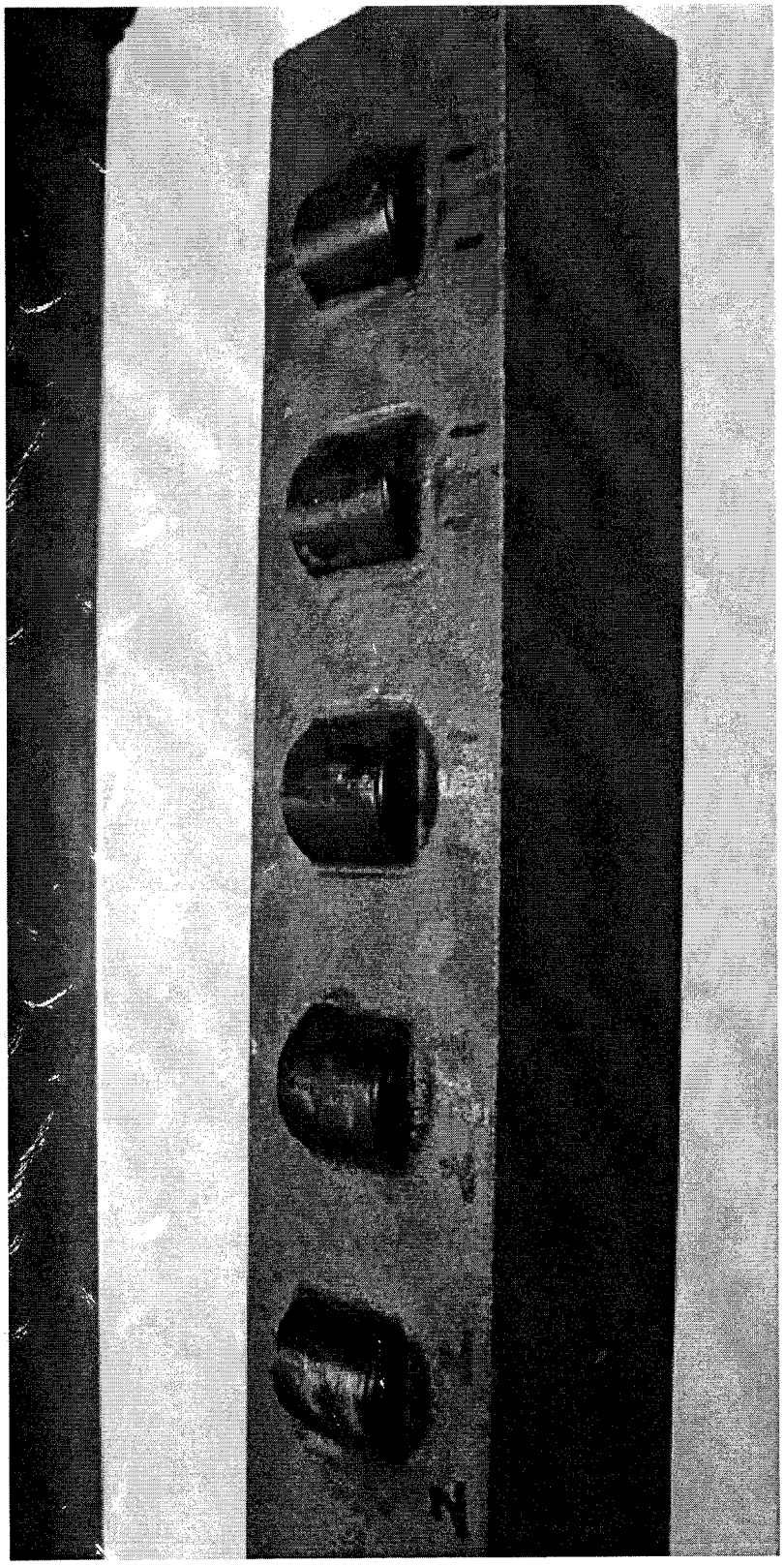
FIG. 17 shows samples of top loading cutters brazed to cutter pockets.

FIGS. 16A-D show photomicrographs of the braze thicknesses and coverage of a sample prepared for case C at high magnifications. Specifically, FIG. 16A shows the braze joint along Side 1 of sample C1 at a 200× magnification. FIG. 16B shows the braze joint along the bottom wall of sample C1 at a 200× magnification, and FIG. 16C shows the braze joint along Side 2 of sample C1 at a 200× magnification. FIG. 16D is a photomicrograph taken at a lower magnitude (100×) to show porosity and slag within the braze joint along the bottom wall of sample C1.

Figure 18:
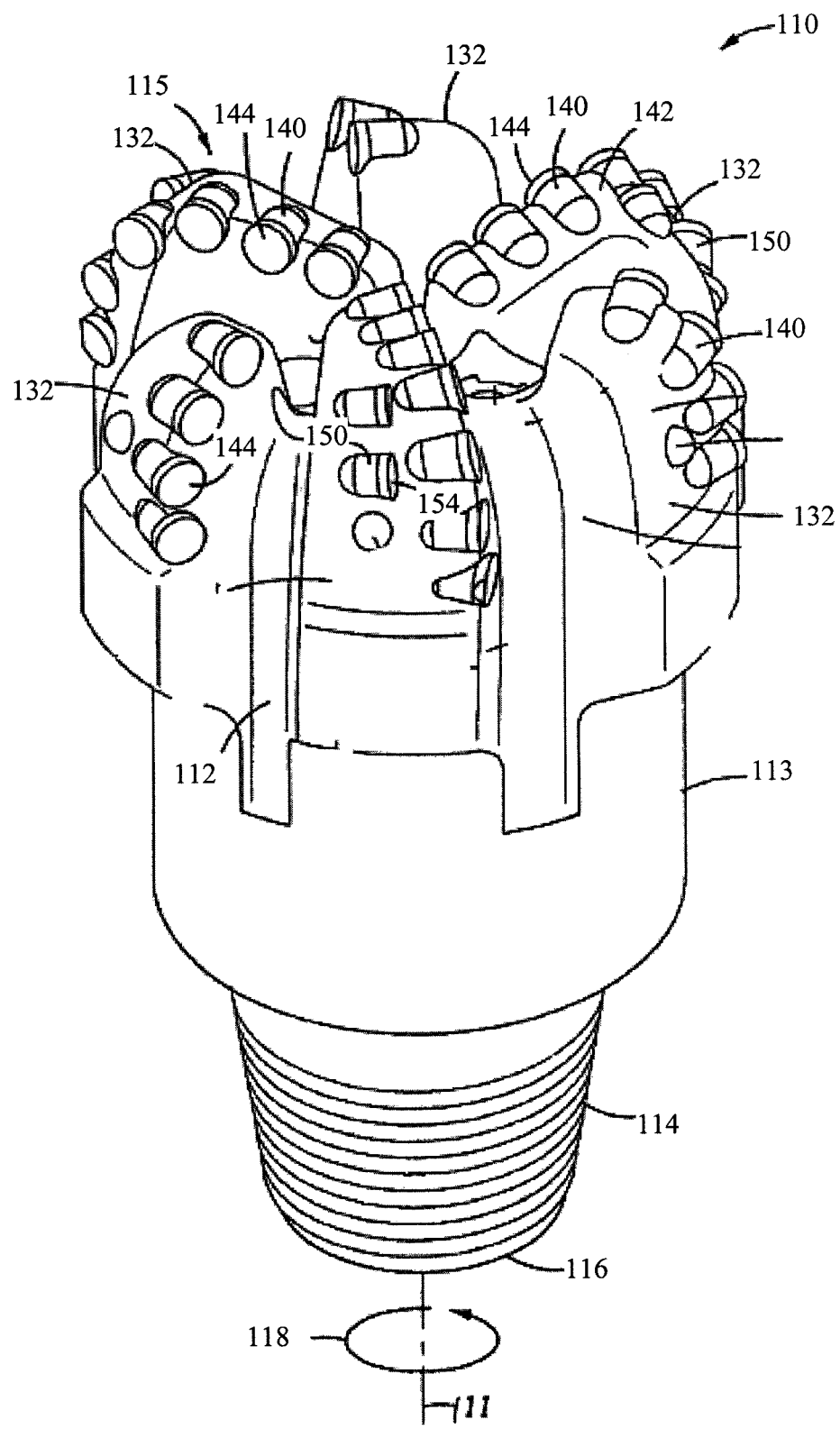
FIG. 18 shows a fixed cutter drill bit.

Referring now to FIG. 18, an embodiment of a fixed cutter drill bit is shown. Bit 110 generally includes a bit body 112, a shank 113 and a threaded connection or pin 114 for connecting bit 110 to a drill string (not shown), which is employed to rotate the bit in order to drill the borehole. Bit face 120 supports a cutting structure 115 and is formed on the end of the bit 110 that is opposite pin end 116. Bit 110 further includes a central axis 111 about which bit 110 rotates in the cutting direction represented by arrow 118. Body 112 may be formed in a conventional manner using powdered metal tungsten carbide particles in a binder material to form a hard metal cast matrix. Alternatively, the body can be machined from a metal block, such as steel, rather than being formed from a matrix.

Cutting structure 115 is provided on face 120 of bit 110. Cutting structure 115 includes a plurality of blades which extend from bit face 120. In the embodiment illustrated in FIG. 18, cutting structure 115 includes six angularly spaced-apart blades 132 (including three primary and three secondary blades; however any combination and arrangement of blades is within the scope of the present disclosure).

Each blade 132 includes a cutter-supporting surface 142 for mounting a plurality of cutter elements. A plurality of primary cutter elements 140, each having a primary cutting face 144, are mounted to each of the blades as front loading cutters. In addition, a plurality of backup cutter elements 150, which are top loading cutters, each having a backup cutting face 154, are mounted on some of the blades 132 rearward or trailing primary cutter elements 140. More specifically, backup cutter elements 150 are positioned adjacent one another generally in a second or trailing row. When bit 110 rotates about central axis 111 in the cutting direction represented by arrow 118, primary cutter elements 140 lead or precede each backup cutter element 150 provided on the same blade 132. Thus, as used herein, the term "backup cutter element" may be used to refer to a cutter element that trails another cutter element disposed on the same blade when the bit (e.g., bit 110) is rotated in the cutting direction. Consequently, as used herein, the term "primary cutter element" may be used to refer to a cutter element that does not trail any other cutter elements on the same blade. The backup cutter elements 150 may be brazed to the bit 110 in accordance with the present disclosure on either a primary or secondary blade.

Figure 19:
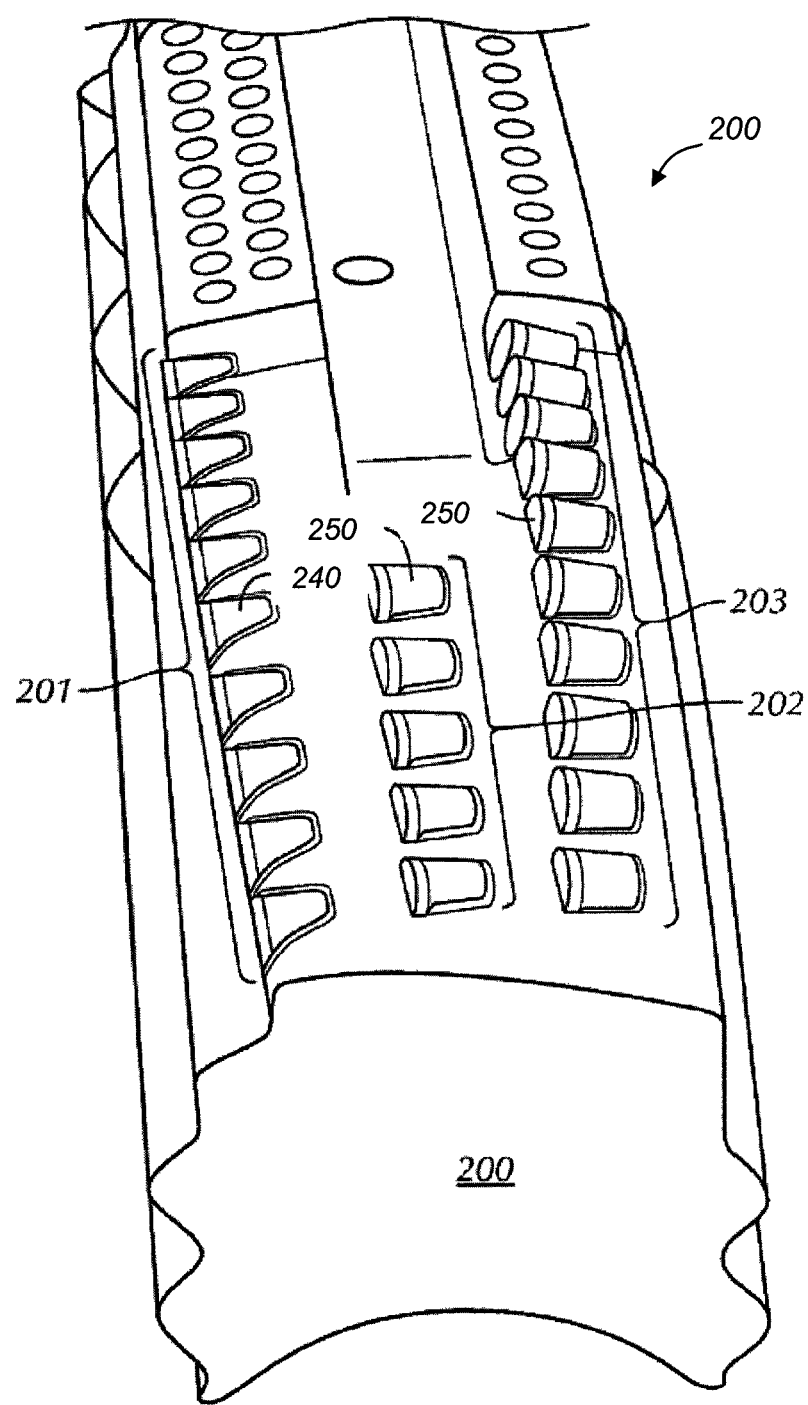
FIG. 19 shows a cutter block for a hole enlargement tool.

Referring now to FIG. 19, an embodiment of cutter block used on a reamer or other hole enlargement tool is shown. In this embodiment, cutter block 200 includes a first row 201 of front loading cutting elements 240, a second row 202 of top loading cutting elements 250, and a third row 203 of top loading cutting elements 250. The rows 201, 202, 203 are aligned along a longitudinal length of cutter block 200. Cutter block 200 may be located on a reamer arm, which as known in the art, may be expandable, as described in U.S. Patent Publication No. 2010/0276201, which is assigned to the present assignee and herein incorporated by reference in its entirety, or not expandable, as shown for example in FIG. 4 of U.S. Patent Publication No. 2009/0055135, which is assigned to the present assignee and herein incorporated by reference in its entirety. The cutting elements 250 located on second or third rows may be brazed to the cutter block (or reamer arm or blade) in accordance with the present disclosure.

Advantageously, as seen in the results of an exemplary case study comparing brazing methods according to the present disclosure to conventional brazing, embodiments disclosed herein provide for improved brazing of top loaded cutters. Top loading cutters are loaded into cutter pockets from the top of the drilling tool, which may allow for a more exact fit between the cutter pocket and the top loading cutter. The tight-fitting shape may allow for more cutter pockets (and thus cutting elements) to fit on the drilling tool. Further, the brazing methods of the present disclosure may allow for consistent improvements in braze thickness and coverage for top loading cutters brazed to a drilling tool because such brazing methods may be automated, whereas conventional brazing methods may rely on the skill of each operator.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of brazing a top loading cutter into a cutter pocket comprising:
   placing at least one braze disc between an inner wall of the cutter pocket and a portion of the top loading cutter, the top loading cutter being oriented such that an axis of the top loading cutter extends through a cutting face of the top loading cutter and is substantially parallel to a bottom portion of the cutter pocket; and
   heating the at least one braze disc to a temperature above the melting temperature of the braze disc.

2. The method of claim 1, further comprising applying a flux material prior to heating.

3. The method of claim 1, wherein the braze disc comprises a material selected from at least one of silver, copper, nickel, iron, and alloys thereof.

4. The method of claim 3, wherein the heating step comprises one of microwave heating, vacuum heating, or furnace heating.

5. The method of claim 1, wherein the braze disc comprises a silver alloy.

6. The method of claim 1, further comprising placing a weight on top of the top loading cutter, opposite from the braze disc, prior to heating the braze disc.

7. The method of claim 1, wherein the at least one braze disc is about 0.05 inches thick.

8. The method of claim 1, wherein the inner wall comprises the bottom portion and side portions, and wherein the at least one braze disc is the same shape as the bottom portion of the cutter pocket.

9. The method of claim 1, wherein the braze disc is circular.

10. The method of claim 1, wherein the braze disc is square.

11. The method of claim 1, further comprising cleaning the top loading cutter and the cutter pocket prior to placing.

12. A cutting tool comprising:
    a tool body;
    at least one cutter pocket formed in the tool body, the at least one cutter pocket comprising an inner wall, wherein the inner wall comprises:
      a bottom;
      a front wall;
      a back wall opposite from the front wall;
      a first side wall between the front wall and the back wall; and
      a second side wall opposite from the first side wall and between the front wall and the back wall;
    a top loading cutter brazed into the at least one cutter pocket; and
    a braze material used to braze the top loading cutter to the at least one cutter pocket,
      wherein the braze material is disposed between the top loading cutter and the inner wall of the cutter pocket; and
      wherein the braze material has a thickness in the range of about 0.003 inches to about 0.01 inches.

13. The cutting tool of claim 12, wherein the braze material covers at least 75% of the inner wall of the cutter pocket.

14. The cutting tool of claim 12, wherein the braze material covers at least 90% of each of the bottom, the front wall, the back wall, the first side wall, and the second side wall of the cutter pocket.

15. The tool of claim 12, wherein the braze material comprises at least one of silver, copper, nickel, iron, and alloys thereof.

16. The tool of claim 12, wherein the tool is a reamer.

17. The tool of claim 12, wherein the tool is a fixed cutter drill bit and wherein the top loading cutter trails a front loading cutter.

* * * * *